US005490866A

United States Patent [19]

Guth

[11] Patent Number: 5,490,866

[45] Date of Patent: Feb. 13, 1996

[54] PROCESS FOR WASHING OFF PRINTS OR DYEINGS ON CELLULOSIC TEXTILE MATERIALS

[75] Inventor: Christian Guth, Birsfelden, Switzerland

[73] Assignee: Ciba-Geigy Corporation, Tarrytown, N.Y.

[21] Appl. No.: 245,389

[22] Filed: May 18, 1994

[30] Foreign Application Priority Data

May 24, 1993 [CH] Switzerland ............................ 1554/93

[51] Int. Cl.$^6$ ............................... C09B 62/04; C11D 7/60

[52] U.S. Cl. .......................... 8/549; 8/543; 8/553; 8/632; 8/137.5; 8/139; 252/174.23; 252/8.8

[58] Field of Search ............................... 8/549, 553, 557, 8/625, 632, 137.5, 139; 252/174.23, 8.6, 8.8

[56] References Cited

U.S. PATENT DOCUMENTS

| | | | |
|---|---|---|---|
| 4,314,804 | 2/1982 | Fennekels et al. | 8/137 |
| 4,448,581 | 5/1984 | Fennekels et al. | 8/137 |
| 4,954,292 | 9/1990 | Hull et al. | 252/542 |
| 4,975,530 | 12/1990 | Tzikas et al. | 534/633 |

FOREIGN PATENT DOCUMENTS

| | | |
|---|---|---|
| 262897 | 4/1988 | European Pat. Off. . |
| 298041 | 1/1989 | European Pat. Off. . |
| 2263298 | 3/1974 | France . |
| 900998 | 2/1960 | United Kingdom . |
| 1300394 | 12/1972 | United Kingdom . |
| 1493085 | 11/1977 | United Kingdom . |
| 1529645 | 10/1978 | United Kingdom . |

*Primary Examiner*—Margaret Einsmann
*Attorney, Agent, or Firm*—George R. Dohmann

[57] ABSTRACT

A process is disclosed for washing-off prints or dyeings produced with dyes on cellulosic textile materials, which comprises treating the printed or dyed fabrics in an aqueous wash liquor with a washing-off formulation comprising (a) a polyvinyl pyrrolidone homopolymer or copolymer, and (b) a water softener.

The inventive process makes it possible to remove unfixed dye from the fibre material completely and thus to enhance the fastness properties of the dyeings.

12 Claims, No Drawings

PROCESS FOR WASHING OFF PRINTS OR DYEINGS ON CELLULOSIC TEXTILE MATERIALS

The present invention relates to a process for washing off prints or dyeings produced with dyes on cellulosic textile materials.

Dyeings and prints on cellulosic fibre materials are usually subjected after fixing and subsequent rinsing to a hot wash treatment to effect as far as possible complete removal of unfixed dye. Especially when dyeing with highly substantive dyes, this wash treatment is crucial for the fastness properties of the dyeings, especially wetfastness and rub fastness. It is therefore an important constituent of the entire dyeing process.

It has been found that the formulations customarily used in the wash treatment, viz. an organic synthetic washing agent on the one hand and an inorganic compound such as a phosphate on the other, do not always meet the requirements of the dyer, especially when using highly substantive dyes. Hence there is a need to provide improved formulations for washing off prints or dyeings produced with dyes on cellulosic textile materials.

Novel washing-off formulations have now been found that make it possible to obtain dyeings and prints with outstanding wetfastness properties on cellulosic fabrics.

Accordingly, the invention relates to a process for washing off prints or dyeings produced with dyes on cellulosic textile materials, which comprises treating the printed or dyed fabrics in an aqueous wash liquor comprising (a) a polyvinyl pyrrolidone homopolymer or copolymer, and (b) a water softener.

The polymer (a) is preferably selected from polyvinyl pyrrolidone homopolymers or copolymers containing ≧20% molar, preferably ≧50% molar and, most preferably, ≧75% molar, of vinyl pyrrolidone units.

If the polymer (a) is a polyvinyl pyrrolidone copolymer, then suitable comonomers are typically carboxyl group-containing, sulfo group-containing or phosphoric acid group-containing monomers or other ethylenically unsaturated monomers.

Suitable sulfo group-containing monomers typically include:

(meth)acrylamidomethanesulfonic acid,
vinylsulfonic acid,
(meth)allylsulfonic acid,
2-acrylamido-2-methylpropanesulfonic acid,
3-(meth )acrylamidopropanesulfonic acid,
3-sulfopropyl(meth)acrylate,
bis(3-sulfopropylitaconate),
4-styrenesulfonic acid, and
3-allyloxy-2-hydroxypropylsulfonic acid.

Suitable comonomers with carboxyl function typically include: (meth)acrylic acid maleic acid, fumaric acid, itaconic acid, mesaconic acid, citraconic acid, vinylacetic acid, vinyloxyacetic acid, vinylpropionic acid, crotonic acid, aconitic acid, allylacetic acid, allyloxyacetic acid, α,β-dimethylacrylic acid, allylmalonic acid, allyloxymalonic acid, methylenemalonic acid, 2-hydroxy(meth)acrylic acid, 2-halo(meth)acrylic acid, α-ethylacrylic acid, acrylamidoglycolic acid, citraconic acid, glutaconic acid, β-carboxyethylacrylate, allyloxy-3-hydroxybutanoic acid and allylsuccinic acid.

Suitable comonomers containing a phosphoric acid group are typically vinylphosphonic acid, (meth)allylphosphonic acid and acrylamidomethylpropanephosphonic acid.

The following ethylenically unsaturated compounds are also suitable comonomers: N-vinylformamide, N-vinyl-N-methylformamide, N-vinylacetamide, N-vinyl-N-methylacetamide, N-vinyl-N-ethylacetamide, N-vinylimidazole, N-vinyl-N-methylimidazole, N-vinylimidazoline, N-vinyl-2-methylimidazoline, N-vinylcaprolactam, vinyl acetate, vinyl propionate, vinyl butyrate, $C_1$–$C_{22}$alkyl vinyl ketone, $C_1$–$C_{22}$alkyl vinyl ether, olefins (ethylene, propylene, isobutene), 1,2-dimethoxyethylene, styrene derivatives, hydroxyethyl/hydroxypropyl/hydroxybutyl (meth)acrylate, $C_1$–$C_{22}$alkyl (meth)acrylate, (meth)acrolein, (meth)acrylonitrile, (meth)acrylamide, ester/(subst.) amides/nitriles of the monomers having carboxyl function, N-mono/N-disubstituted (meth)acrylamide ($C_1$–$C_{22}$), alkoxy(meth)acrylates, $EO_x$—$PO_y$—$ButO_z$ in which x,y,z=0–250, dimethyl/diethylaminoethyl/propyl/butyl (meth)acrylates in salt form or in quaternised form, suitable quaternising agents being dimethyl sulfate, diethyl sulfate, methyl chloride, ethyl chloride or benzyl chloride.

If the polymer (a) is a polyvinyl pyrrolidone copolymer, then preferred comonomers are acrylic acid, methacrylic acid, acrylamide, acrylates and methacrylates.

A particularly suitable component (a) of the washing-off formulations useful in the practice of this invention are polyvinyl pyrrolidone homopolymers and, among these, preferably those having an average molecular weight in the range from 1,000 to 1,000,000 and, most preferably, from 2,500 to 750,000.

Suitable water softeners (b) may be alkali silicates, zeolites, carboxyl group-containing homopolymers or copolymers, polyphosphates or polyphosphonates. It is also possible to use mixtures of different water softeners.

If the water softener (b) is an alkali silicate, then suitable silicates are quite generally all $Me_2O$:$SiO_2$ compositions. Typical examples are water glasses, anhydrous metasilicates as well as metasilicate hydrates. Water-soluble alkali silicates are of particular interest, preferably water-soluble sodium or potassium silicates and, most preferably, water-soluble, sodium silicates. The alkali silicates have a $Me_2O$:$SiO_2$ ratio of 0.5 to 3.5 and, preferably, of 1 to 3.5, wherein Me is an alkali metal cation, suitably the lithium, potassium or, preferably, sodium, cation.

Preferred alkali silicates are anhydrous potassium or sodium metasilicates or potassium or sodium metasilicate 5- to 10-hydrates. It is very particularly preferred to use anhydrous sodium metasilicate or sodium metasilicate-5- or -9-hydrate as component (b) of the novel washing-off formulation.

If the water softener (b) is a carboxyl group-containing homopolymer or copolymer, then the suitable monomers are those cited as suitable comonomers for the polyvinyl pyrrolidone copolymers. Homopolymers of acrylic acid, methacrylic acid or α-hydroxyacrylic acid are particularly suitable. Also suitable are homopolymers of crotonic acid, maleic acid, itaconic acid, mesaconic acid, aconitic acid, methylenemalonic acid or citraconic acid as well as copolymers of the carboxylic acid acids cited above with one another or with other aforementioned ethylenically unsaturated compounds, suitably with ethylene, propylene, vinyl alcohol, vinyl ether, vinyl acetate, divinyl dioxane, divinyl benzene, styrene, vinyl esters, furan, acrolein, acrylamide or acrylonitrile.

The molecular weight of the carboxyl group-containing homo- or copolymers is usually in the range from 1,000 to 1,000,000 and, preferably, from 5,000 to 500,000. The polymeric carboxylic acids are preferably used in salt form, e.g. as alkali metal salt, ammonium salt or amine salt.

Illustrative examples of polyphosphates (b) are sodium diphosphate or sodium tripolyphosphate.

Illustrative examples of suitable phosphonates (b) am aminotrimethylenephosphonic acid (ATMP), diethyltriaminepentamethylenephosphonic acid (DPPA), 1-hydroxyethane-1,1-diphosphonic acid (HEDP), water-soluble salts of the cited acids as well as monomers and oligomers of formula

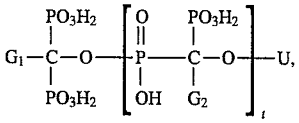

wherein U is hydrogen or —C(O)$G_3$, $G_1$, $G_2$ and $G_3$ are each independently of one another a $C_1$–$C_4$alkyl radical and t is an integer from 1 to 14, and the water-soluble salts thereof.

Components (a) and (b) of the novel washing-off formulations are known per se or can be obtained by known methods.

In addition to containing components (a) and (b), the novel washing-off formulations may contain further customary auxiliaries and additives.

Anhydrous novel washing-off formulations may contain as further component a dust inhibitor. Those skilled in the art will be familiar with conventional dust inhibitors, for example those based on paraffin oil, oleyl polyglycol ethers and/or polyethylene glycols. The dust inhibitor is typically present in an amount of 0 to 5% by weight and, preferably, of 0 to 1% by weight, based in each case on the washing-off formulation.

The amount of components (a) and (b) present in the washing-off formulations of this invention in liquid (aqueous) form or, preferably, in solid form is conveniently >50% by weight, preferably >75% by weight and, most preferably, ≧85% by weight, based on total solids.

The novel washing-off formulations can be prepared by simple mixing of components (a) and (b) to give homogeneous mixtures.

Anhydrous washing-off formulations preferably contain, based on the formulation, conveniently 5 to 50% by weight of component (a) and 95 to 50% by weight of component (b) and, preferably, 10 to 25% by weight of component (a) and 90 to 75% by weight of component (b).

Preferred embodiments of the inventive process relate to:

[I] the use of a washing-off formulation comprising
- (a) a polyvinyl pyrrolidone homopolymer or copolymer, and
- (b) an alkali silicate;

[II] the use of a washing-off formulation comprising
- (a) a polyvinyl pyrrolidone homopolymer and
- (b) an alkali silicate;

[III] the use of a washing-off formulation comprising
- (a) a polyvinyl pyrrolidone homopolymer having an average molecular weight of 1,000 to 1,000,000 and
- (b) an alkali silicate selected from the group consisting of water glasses, anhydrous metasilicate and metasilicate hydrates, and having a $Me_2O:SiO_2$ ratio of 0.5 to 3.5;

[IV] the use of a washing-off formulation comprising
- (a) a polyvinyl pyrrolidone homopolymer having an average molecular weight of 2,500 to 750,000 and
- (b) an alkali silicate having a $Me_2O:SiO_2$ ratio of 1 to 3.5;

[V] the use of a washing-off formulation consisting of
- (a) 5 to 50% by weight of a polyvinyl pyrrolidone homopolymer having an average molecular weight of 2,500 to 750,000,
- (b) 95 to 50% by weight of a potassium or sodium metasilicate, and
- (c) 0 to 5% by weight of a dust inhibitor;

[VI] the use of a washing-off formulation consisting of
- (a) 10 to 25% by weight of a polyvinyl pyrrolidone homopolymer having an average molecular weight of 2,500 to 750,000, and
- (b) 90 to 75% by weight of anhydrous sodium metasilicate or sodium metasilicate-5- or -9-hydrate, and
- (c) 0 to 1% by weight of a dust inhibitor.

The process of this invention is especially suitable for washing off prints or dyeings on cellulosic fibre materials. Suitable cellulosic fibre materials are pure cellulose fibres or blends of cellulose and synthetic organic material, typically linear polyesters or modified cellulose (cellulose esters). By cellulose is meant in this context natural and regenerated cellulose, e.g. hemp, linen, jute, viscose silk, viscose rayon or, preferably, cotton.

The material to be dyed can be in any form of presentation, conveniently in the form of loose material (flocks), doubled, partially oriented staple fibre ribbon, or of filaments, yarns, but preferably of woven or knit goods.

The cellulosic fibre matrerials can be printed or dyed by any process. Suitable dyes for this purpose are conveniently the vat dyes disclosed in the Colour Index, 3rd Edition (1971), Volume 3, on pages 3719–3837, and the direct dyes described in the Colour Index, 3rd Edition (197 1), Volume 2 on pages 2005–478 as "Direct Dyes"; or, in particular, reactive dyes, i.e. dyes which contain fibre-reactive radicals that are are able to react with the hydroxyl groups of cellulose to form covalent chemical bonds.

If the dyes used for dyeing or printing are reactive dyes, then they are suitably the dyes described in the Colour Index, 3rd Edition (1971), Volume 2 on pages 3391–3562 as "Reactive Dyes". The reactive dyes contain e.g. a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide chromophore and, preferably, a monoazo, disazo, metal complex azo, formazan, anthraquinone, phthalocyanine or dioxazine chromophore. Typical examples are the chromophores based on the radicals $A_1$ and $A_2$ described hereinbelow.

The reactive dyes contain one or more than one sulfo group and may also be further substituted. Illustrative examples of such substituents are alkyl groups of 1 to 4 carbon atoms, typically methyl, ethyl, propyl, isopropyl or butyl; alkoxy groups of 1 to 4 carbon atoms, typically methoxy, ethoxy, propoxy, isopropoxy or butoxy; acylamino groups of 1 to 8 carbon atoms, preferably alkanoylamino groups such as acetylamino, propionylamino or benzoylamino, phenylamino, N,N-di-β-hydroxyethylamino, N,N-di-β-sulfatoethylamino, sulfobenzylamino, N,N-disulfobenzylamino, alkoxycarbonyl containing 1 to 4 carbon atoms in the alkoxy moiety, typically methoxycarbonyl or ethoxycarbonyl; alkylsulfonyl of 1 to 4 carbon atoms such as methylsulfonyl or ethylsulfonyl; trifluoromethyl, nitro, cyano, halogen such as fluoro, chloro or bromo; carbamoyl, N-alkylcarbamoyl containing 1 to 4 carbon atoms in the alkyl moiety, e.g. N-methylcarbamoyl or N-ethylcarbamoyl; sulfamoyl, N-alkylsulfamoyl of 1 to 4 carbon atoms such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl)sulfamoyl, N-phenylsulfamoyl, ureido, hydroxy, carboxy, sulfomethyl or sulfo. Preferably the reactive dyes contain one or more than one sulfonic acid group. Further preferred substituents at the chromophore are methyl, ethyl, methoxy, ethoxy, acetylamino, benzoylamino, amino, chloro, bromo, ureido, hydroxy, carboxy, sulfomethyl or sulfo.

Illustrative examples of suitable fibre-reactive radicals that carry the chromophores direct or bonded through suitable linking groups are typically an alkanoyl or alkylsulfonyl radical which is substituted by a removable atom or a removable group, an alkenoyl or alkenesulfonyl radical which is substituted by a removable atom or a removable group, or an alkenoyl or alkenesulfonyl radical which contains a vinyl group. These alkanoyl, alkylsulfonyl and alkenesulfonyl radicals usually contain 2 to 8 carbon atoms and the alkenoyl radicals usually contain 3 to 8 carbon atoms. Radicals which are substituted by a removable atom or removable group and which contain 4-, 5- or 6-membered carbocyclic or heterocylic rings may also be mentioned. Suitable heterocyclic radicals are typically those that contain at least one removable substituent bonded to a heterocyclic radical, including those that contain at least one reactive substituent bonded to a 5- or 6-membered heterocyclic ring, conveniently to a monoazine, diazine, triazine, pyridine, pyrimidine, pyridazine, pyrazine, thiazine, oxazine or asymmetrical or symmetrical triazine ring, or to such a ring system that contains one or more than one fused aromatic ring, for example a quinoline, phthalazine, quinoline, quinazoline, quinoxaline, acridine, phenazine and phenanthridine ring system.

Removable atoms or removable groups are, in addition to others, typically halogens such as fluoro, chloro or bromo, ammonium, including hydrazinium, sulfato, thiosulfato, phosphato, acetoxy, propionoxy, azido, carboxypyridinium or thiocyanato.

The linking group between the dye radical and the fibre-reactive radical may be, in addition to the direct bond, selected from numerous different radicals. The linking group is typically an aliphatic, aromatic or heterocyclic radical, and may also be composed of different radicals of this type. The linking group usually contains at least one functional group, for example the carbonyl group or the amino group, which amino group may be further substituted by $C_1$–$C_4$alkyl which is in turn substituted by halogen, hydroxy, cyano, $C_1$–$C_4$alkoxy, $C_1$–$C_4$alkoxycarbonyl, carboxy, sulfamoyl, sulfo or sulfato. An aliphatic radical is suitably an alkylene radical of 1 to 7 carbon atoms or a branched isomer thereof. The carbon chain of the alkylene chain can be interrupted by a hetero atom, e.g. an oxygen atom. An aromatic radical is suitably a phenyl radical which may be substituted by $C_1$–$C_4$alkyl such as methyl or ethyl, $C_1$–$C_4$alkoxy such as methoxy or ethoxy, halogen such as fluoro, bromo or, preferably, chloro, carboxy or sulfo. And a heterocyclic radical may suitably be a piperazine radical.

Illustrative examples of fibre-reactive radicals are: vinylsulfonyl, β-chloroethylsulfonyl, β-sulfatoethylsulfonyl, β-acetoxyethylsulfonyl, phosphatoethylsulfonyl, β-thiosulfatoethylsulfonyl, N-methyl-N-(β-sulfoethylsulfonyl)amino, acryloyl, mono-, di- or trichloroacryloyl, such as $—CO—CCl=CH_2$, or $—CO—CH=CH—Cl$, $—CO—CCl=CH—CH_3$; mono-, di- or tribromoacryloyl, such as $—CO—CBr=CH_2$, $—CO—CH=CH—Br$, or $—CO—CBr=CH—CH_3$; and $—CO—CCl=CH—COOH$, $—CO—CH=CCl—COOH$, $—CO—CBr=CH—COOH$, $—CO—CH=CBr—COOH$, $—CO—CCl=CCl—COOH$, or $—CO—CBr=CBr—COOH$; precursors of the acryloyl radical and of derivatives of the acryloyl radical, such as β-chloro- or β-bromopropionyl, 3-phenylsulfonylpropionyl, 3-methylsulfonylpropionyl, 2-chloro-3-phenylsulfonylpropionyl, 2,3-dichloropropionyl or 2,3-dibromopropionyl; and 2-fluoro-2-chloro-3,3-difluorocyclobutane- 1-carbonyl, 2,2,3,3-tetrafluorocyclobutane-1-carbonyl or -1-sulfonyl, β-(2,2,3,3-tetrafluorocyclobut- 1-yl)acryloyl, α- or β-alkenyl- or arylsulfonylacryloyl groups such as α- or β-methylsulfonylacryloyl, chloroacetyl, bromoacetyl, 4-(β-chloroethylsulfonyl)butyryl, 4-vinylsulfonylbutyryl, 5-(β-chloroethylsulfonyl)caproyl or 6-vinylsulfonylcaproyl; and 4-fluoro-3-nitrobenzoyl, 4-fluoro-3-nitrophenylsulfonyl, 4-fluoro-3-methylsulfonylbenzoyl, 4-fluoro-3-cyanobenzoyl or 2-fluoro-5-methylsulfonylbenzoyl.

The following reactive radicals may also be cited by way of example: symmetrical mono- or dihalotriazinyl radicals, including 2,4-dichlorotriazin-6-yl, 2-amino-4-chlorotriazin-6-yl, 2-alkylamino-4-chlorotriazin-6-yl, e.g. 2-methylamino-4 -chlorotriazin-6-yl, 2-ethylamino- or 3-propylamino-4-chlorotriazin-6-yl, 2-β-oxethylamino-4-chlorotriazin-6-yl, 2-di-β-oxethylamino-4-chlorotriazin-6-yl and the corresponding sulfuric acid half-esters, 2-diethylamino-4-chlorotriazin-6-yl, 2-morpholino- or 2-piperidino- 4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or sulfophenyl)amino-4-chlorotriazin-6-yl, 2-alkoxy-4-chlorotriazin- 6-yl, such as 2-methoxy- or ethoxy-4-chlorotriazin-6-yl, 2-(phenylsulfonylmethoxy)- 4-chlorotriazin-6-yl, 2-aryloxy and substituted aryloxy-4-chlorotriazin-6-yl, such as 2-phenoxy-4-chlorotriazin-6-yl, 2-(p-sulfophenyl)oxy-4-chlorotriazin-6-yl, 2-(o-, m- or p-methyl- or p-methoxyphenyl)oxy-4-chlorotriazin-6-yl, 2-alkylmercapto- or 2-arylmercapto- or 2-(substituted aryl)mercapto-4-chlorotriazin-6-yl, such as 2-β-hydroxyethylmercapto- 4-chlorotriazin-6-yl, 2-phenylmercapto-4-chlorotriazin-6-yl, 3-(4'-methylphenyl)mercapto-4-chlorotriazin-6-yl, 2-(2',4'-dinitro)-phenylmercapto- 4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, and alkyl is unsubstituted or substituted $C_1$–$C_4$alkyl, aralkyl is preferably unsubstituted or substituted phenyl-$C_1$–$C_4$alkyl, and aryl is preferably phenyl or naphthyl which are unsubstituted or substituted by sulfo, $C_1$–$C_4$alkyl, $C_1$–$C_4$alkoxy, carboxyl groups, acylamino groups and halogen such as fluoro, chloro or bromo, typically 2-amino-4-fluorotriazin-6-yl, 2-methylamino-4-fluorotriazin- 6-yl, 2-ethylamino-4-fluorotriazin-6-yl, 2-isopropylamino-4-fluorotriazin-6-yl,2-dimethylamino- 4-fluorotriazin-6-yl, 2-diethylamino-4-fluorotriazin-6-yl, 2-β-methoxyethylamino- 4-fluorotriazin-6-yl, 2-β-hydroxyethylamino-4-fluorotriazin-6-yl, 2-bis(β-hydroxyethylamino)- 4-fluorotriazin-6-yl, 2-β-sulfoethylamino-4-fluorotriazin-6-yl, 2-β-sulfoethylmethylamino- 4-fluorotriazin-6-yl, 2-carboxymethylamino-4-fluorotriazin-6-yl, 2-β-cyanoethylamino-4-fluorotriazin-6-yl, 2-benzylamino-4-fluorotriazinyl-6-yl, 2 -β-phenylethylamino- 4-fluorotriazin-6-yl, 2-benzylmethylamino-4-fluorotriazin-6-yl, 2-(2'-, 3'- or 4'-sulfobenzyl)amino-4-fluorotriazin-6-yl, 2-cyclohexylamino-4-fluorotriazin-6-yl, 2-(o-, m-, p-methylphenyl)amino-4-fluorotriazin-6-yl, 2-(o-, m-, p-sulfophenyl)amino-4-fluorotriazin-6-yl, 2-(2',5'-disulfophenyl)amino-4-fluorotriazin- 6-yl, 2-(o-, m-, p-chlorophenyl)amino-4-fluorotriazin-6-yl, 2-(o-, m-, p-methoxyphenyl)-4-fluorotriazin-6-yl, 2-(2'-methyl-4'-sulfophenyl)amino-4-fluorotriazin- 6-yl, 2-(2'-methyl-5'-sulfophenyl)amino-4-fluorotriazin-6-yl, 2-(2'-chloro- 4'-sulfophenyl)amino-4-fluorotriazin-6-yl, 2-(2'-chloro-5'-sulfophenyl)amino-4-fluorotriazinyl-6, 2-(2'-methoxy-4'-sulfophenyl)amino-4-fluorotriazin-6-yl, 2-(o-, m-, p-carboxyphenyl)amino-4-fluorotriazin-6-yl, 2-(2',4'-disulfophenyl)amino- 4-fluorotriazin-6-yl, 2-(3',5'-disulfophenyl)amino-4-fluorotriazin-6-yl, 2-(2'-carboxy-4-sulfophenyl)amino-4-fluorotriazin-6-yl, 2-(2'-carboxy-4 -sulfophenyl)amino- 4-fluorotriazin-6-yl, 2-(6'-sulfonaphth-2'-yl)amino-4-fluorotriazin-6-yl, 2-(4',8'-disulfonaphth-2'-yl)amino-4-fluorotriazin-6-yl, 2-(6',8'-disulfonaphth- 2'-yl)-amino- 4-fluorotriazin-6-yl, 2-(N-methylphenyl)amino-4-fluorotriazin-6-yl, 2-(N-ethylphenyl)amino- 4-fluorotriazin-6-yl, 2-(N-β-hydroxyethylphenyl)amino-4-fluorotriazin- 6-yl, 2-(N-isopropylphenyl)amino-4-fluorotriazin-6-yl, 2-morpholino-4-fluorotriazin- 6-yl, 2-piperidino-4-fluorotriazin-6-yl, 2-(4',6',8'-trisulfonaphth-2'-yl)- 4-fluorotriazin-6-yl, 2-(3',6',8'-trisulfonaphth-2'-yl)-4-fluorotriazin-6-yl, 2-(3',6'-disulfonaphth-1'-yl)-4-fluorotriazin-6-yl, mono-, di- or trihalopyrimidinyl radicals such as 2,4-dichloropyrimidin-6-yl, 2,4,5-trichloropyrimidin-6-yl, 2,4-dichlor-5-nitro- or -5-methyl- or -5-carboxymethyl- or -5-carboxy- or -5-cyano- or -5-vinyl- or -5-sulfo- or -5-mono-, -di- or -trichloromethyl- or -5-carboalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chlorpyrimidine-5-carbonyl, 2-methylthio-4-fluoropyrimidin-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline- 6-sulfonyl, 1,4-dichlorophthalazine-6-sulfonyl or -6-carbonyl, 2,4-dichloroquinazoline- 7- or -6-sulfonyl or -carbonyl, 2- or 3- or 4-(4',5'-dichloropyridazine- 6'-1'-yl)phenylsulfonyl or -carbonyl, β-(4',5'-dichloro-6'-pyridazon-1'-yl)-ethylcarbonyl, N-methyl-N-(2,4-dichlorotriazin-6-yl)carbamyl, N-methyl-N-(2-methylamino-4-chlorotriazin- 6-yl)carbamyl, N-methyl-N-(2-dimethylamino-4-chlorotriazin-6-yl)carbamyl, N-methyl- or N-ethyl-N-(2,4-dichlorotriazin-6-yl)aminoacetyl, N-methyl-N-(2,3-dichloroquinoxaline-6-sulfonyl)aminoacetyl, N-methyl-N-(2,3-dichloroquinoxaline-6-carbonyl)aminoacetyl, as well as the corresponding bromo and fluoro derivatives of the abovementioned chloro-substituted heterocyclic radicals, including typically 2-fluoro-4-pyrimidinyl, 2,6-difluoro-4-pyrimidinyl, 2,6-difluoro-5-chloro-4-pyrimidinyl, 2-fluoro- 5,6-dichloro-4-pyrimidinyl, 2,6-difluoro-5-methyl-4-pyrimidinyl, 2,5-difluoro-6-methyl- 4-pyrimidinyl, 2-fluoro-5-methyl-6-chloro-4-pyrimidinyl, 2-fluoro-5-nitro-6-chloro-4 -pyrimidinyl, 5-bromo-2-fluoro-4-pyrimidinyl, 2-fluoro-5-cyano-4-pyrimidinyl, 2-fluoro- 5-methyl-4-pyrimidinyl, 2,5,6-trifluoro-4-pyrimidinyl, 5-chloro-6-chloromethyl-2-fluoro- 4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro- 5-chloro-6-methyl-4-pyrimidinyl, 2-fluoro-5-chloro-4-pyrimidinyl, 2-fluoro-6-chloro- 4-pyrimidinyl, 6-trifluoromethyl-5-chloro-2-fluoro-4-pyrimidinyl, 6-trifluoromethyl-2-fluoro- 4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carbamoyl-4-pyrimidinyl, 2-fluoro-5-carbomethoxy-4-pyrimidinyl, 2-fluoro-5-bromo-6-trifluoromethyl-4-pyrimidinyl, 2-fluoro-6-carbamoyl-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5 -methylsulfonyl-4-pyrimidinyl, 2-fluoro-5-sulfamoyl-4-pyrimidinyl, 2-fluoro-5-chloro-6 -carbomethoxy-4-pyrimidinyl, 2,6-difluoro-5-trifluoromethyl-4-pyrimidinyl, 6-fluoro-5 -chloropyrimidin-4-yl, 6-fluoro-5-trifluoromethylpyrimidin-4-yl, 6-fluoro-2-methylpyrimidin- 4-yl, 6-fluoro-5-chloro-2-methylpyrimidin-4-yl, 5,6-difluoropyrimidin-4-yl, 6 -fluoro-5-chloro-2-trifluoromethylpyrimidin-4-yl, 6-fluoro-2-phenylpyrimidin-4-yl, 6-fluoro-5-cyanopyrimidin-4-yl, 6-fluoro-5-nitropyrimidin-4-yl, 6-fluoro-5 -methylsulfonylpyrimidin-4-yl, 6-fluoro-5-phenylsulfonyl-pyrimidin-4-yl, sulfonyl group containing triazine radicals such as 2,4-bis(phenylsulfonyl)triazin-6-yl, 2-(3'-carboxyphenyl)sulfonyl- 4-chlorotriazin-6-yl, 2-(3'-sulfophenyl)sulfonyl-4-chlorotriazin-6-yl, 2,4-bis(3' -carboxyphenylsulfonyl)triazin-6-yl; sulfonyl group containing pyrimidine rings such as 2-carboxymethylsulfonylpyrimidin-4-yl, 2-methylsulfonyl-6-methylpyrimidinyl- 4, 2-methylsulfonyl-6-ethylpyrimidin-4-yl, 2-phenylsulfonyl-5-chloro-6-methylpyrimidinyl, 2,6-bis(methylsulfonyl)pyrimidin-4-yl, 2,6-bis(methylsulfonyl)-5-chloropyrimidin-4-yl), 2,4-bis(methylsulfonyl)pyrimidine-5-sulfonyl, 2-methylsulfonylpyrimidin-4-yl, 2-phenylsulfonylpyrimidin-4-yl, 2-trichloromethylsulfonyl-6-methylpyrimidin-4-yl, 2-methylsulfonyl- 5-chloro-6-methylpyrimidin-4-yl, 2-methylsulfonyl-5-bromo-6-methylpyrimidin- 4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidine-5-sulfonyl, 2-methylsulfonyl-5-nitro-6 -methylpyrimidine-4-yl, 2,5,6-tris(methylsulfonyl)pyrimidin-4-yl, 2-methylsulfonyl-5,6 -dimethylpyridin-4-yl, 2-ethylsulfonyl-5-chloro-6-methylpyrimidin-4-yl, 2-methylsulfonyl- 6-chloropyrimidin-4-yl, 2,6-bis(methylsulfonyl)-5-chloropyrimidin-4-yl, 2-methylsulfonyl-6-carbonylpyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin- 4-yl, 2-methylsulfonyl-5-cyano-6-methoxypyrimidin-4-yl, 2-methylsulfonyl- 5-chloropyrimidin-4-yl, 2-sulfoethylsulfonyl-6-methyl-pyrimidin-4-yl, 2-methylsulfonyl- 5-bromopyrimidin-4-yl, 2-phenylsulfonyl-5-chloropyrimidin-4-yl, 2-carboxymethylsulfonyl- 5-chloro-6-methylpyrimidin-4-yl, 2-methylsulfonyl-6-chloropyrimidin-4-yl and -5-carbonyl, 2,6-bis(methylsulfonyl)pyrimidin-4-yl or -5-carbonyl, 2-ethylsulfonyl- 6-chloropyrimidine-5-carbonyl-, 2,4-bis(methylsulfonyl)pyrimidine-5-sulfonyl, 2-methylsulfonyl-4-chloro-6-methylpyrimidine-5-sulfonyl oder-carbonyl, ammonium group containing triazine rings such as trimethylammonium-4-phenylamino- or -4-(o-, m- or p-sulfophenyl)aminotriazin-6-yl, 2-(1,1-dimethylhydrazinium)-4-phenylamino- or -4-(o-, m- or p-sulfophenyl)aminotriazin-6-yl, 2-(2-isopropylidene-1,1-dimethyl)hydrazinium- 4-phenylamino- or -4-(o-, m- or p-sulfophenyl)aminotriazin-6-yl, 2-N-aminopyrrolidinium or 2-aminopiperidinium-4-phenylamino- or -4-(o-, m- or p-sulfophenyl)aminotriazin-6-yl, 2-N-aminopyrrolidinium- or 2-N-aminopiperidinium-4-phenylamino- or -4-(o-, m- or p-sulfophenyl)aminotriazin- 6-yl, and also 4-phenylamino- or -4-(sulfophenylamino)triazin-6-yl radicals which contain in 2-position 1,4-bisazabicyclo [2,2,2]octane or 1,2-bisazabicyclo[0,3,3]octane attached in quaternary form through a nitrogen bond, 2-pyridinium-4-phenylamino- or 4-(0-, m- or p-sulfophenyl)aminotriazin-6-yl as well as 2-oniumtriazin-6-yl radical which are substituted in 4-position by alkylamino, e.g. methylamino, ethylamino or β-hydroxyethylamino or alkoxy, e.g. methoxy or alkoxy, or aryloxy, e.g. phenoxy or sulfophenoxy groups: 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, e.g. 2-methylsulfonyl- or 2-ethoxysulfonylbenzothiazole-5- or -6-sulfonyl- or -carbonyl, 2-phenylsulfonylbenzothiazole-5- or -6-sulfonyl or -carbonyl and the corresponding 2-sulfonylbenzothiazole-5- or 6-carbonyl- or -sulfonyl derivatives containing sulfo groups in the benzene ring, 2-chlorobenzoxazole-5- or -6-carbonyl or -sulfonyl, 2-chlorobenzimidazole-5- or -6-carbonyl or sulfonyl, 2-chloro-1-methylbenzimidazole-5- or 6-carbonyl or -sulfonyl, 2-chloro-4-methylthiazole-(1,3)-5-carbonyl or -4- or -5-sulfonyl, the N-oxide of 4-chloro- or 4-nitroquinoline-5-carbonyl or also the radicals of 5-chloro-2,6-difluoro- 1,3-dicyanophenyl, 2,4-difluoro-1,3,5-tricyanophenyl, 2,4,5-trifluoro-1,3-dicyanophenyl, 2,4-dichloro-5-methylsulfonylpyrimidin-6-yl, 2,4-trichloro-5-ethylsulfonylpyrimidin-6-yl, 2-fluoro-5-methylsulfonyl-6'-(2'-sulfophenylamino)pyrimidin-4-yl, 2,5-dichloro-6-methylsulfonyl-pyrimidin-4-yl.

A group of suitable reactive groups comprises those of formulae $-SO_2-Z,$ (4)

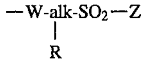 (4a)

$-W\text{-alk-}E\text{-alk'-}SO_2-Z,$ (4b)

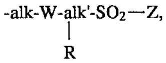 (4c)

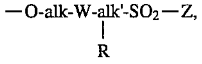 (4d)

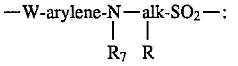 and (4e)

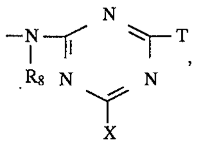 (5)

wherein W is a group of formula $—SO_2—NR_7—$, $—CONR_7—$ or $—NR_7CO—$, $R_7$ is hydrogen, unsubstituted $C_1$–$C_4$alkyl or $C_1$–$C_4$alkyl which is substituted by hydroxy, sulfo, sulfato, carboxy or cyano, or a radical of formula

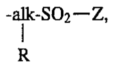

R is hydrogen, hydroxy, sulfo, sulfato, carboxy, cyano, halogen, $C_1$–$C_4$alkoxycarbonyl, $C_1$–$C_4$alkanoyloxy, carbamoyl or the group $—SO_2—Z$, Z is $—CH{=}CH_2$ or $—CH_2CH_2—Y$, Y is a leaving group, E is —O— or $—NR_9$, $R_9$ is hydrogen or $C_1$–$C_4$alkyl, alk and alk' are each independently of the other $C_1$–$C_6$alkylene, arylene is phenylene or naphthylene which are each unsubstituted or substituted by sulfo, carboxy, $C_1$–$C_4$alkyl, $C_1$–$C_4$alkoxy or halogen, $R_8$ is hydrogen or $C_1$–$C_4$alkyl which is unsubstituted or substituted by carboxy, cyano, hydroxy, sulfo or sulfato, and X is a group which can be removed as an anion, and T is a radical of formula

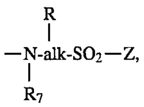 (6a)

-continued

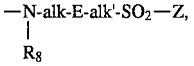 (6b)

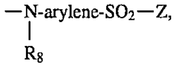 (6c)

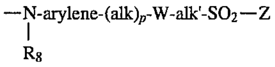 or (6d)

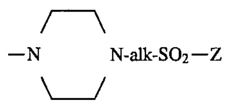 (6e)

wherein R, $R_7$, $R_8$, E, W, Z, alk, alk' and arylene are as defined above and p is 0 or 1.

Suitable leaving groups Y typically include —Cl, —Br, —F, $—OSO_3H$, $—SSO_3H$, $—OCO—CH_3$, $—OPO_3H_2$, $—OCO—CCl_3$, $—OCO—CHCl_2$, $—OCO—CH_2Cl$, $—OSO_2—C_1$–$C_4$alkyl, $—OSO_2—N(C_1–C_4alkyl)_2$ or $—OCO—C_6H_5$.

Preferably Y is a group of formula —Cl, $—OSO_3H$, $—SSO_3H$, $—OCO—CH_3$, $—OCO—C_6H_5$ or $—OPO_3H_2$, preferably $—OSO_3H$.

The substituents alk and alk' may each independently of the other be methylene, ethylene, 1,3-propylene, 1,4-butylene, 1,5-pentylene or 1,6-hexylene or the branched isomers thereof.

Preferably alk and alk' are a $C_1$–$C_4$alkylene radical and, most preferably, an ethylene radical.

R is preferably hydrogen or the group $—SO_2—Z$, wherein Z has the meanings previously assigned to it. Most preferably R is hydrogen.

$R_7$ is preferably hydrogen, $C_1$–$C_4$alkyl or a group -alk—$SO_2$—Z, wherein alk and Z each have the meanings previously assigned to them.

$R_8$ is preferably a $C_1$–$C_4$alkylrest and is most preferably hydrogen.

Arylene is preferably a 1,3- or 1,4-phenylene radical which is unsubstituted or substituted by sulfo, methyl, methoxy or carboxy.

E is preferably —NH— and is most preferably —O—.

W is preferably a group of formula —CONH— or —NHCO—.

X may be fluoro, chloro, bromo, sulfo, $C_1$–$C_4$alkylsulfonyl or phenylsulfonyl and, most preferably, fluoro or chloro.

Further interesting reactive groups are those of formula (5), wherein T is a group which can be removed as an anion or is a non-reactive substituent.

A group T which can be removed as an anion is typically fluoro, chloro, bromo, sulfo,$C_1$–$C_4$alkylsulfonyl or phenylsulfonyl, and is preferably fluoro or chloro.

A non-reactive substituent T may typically be hydroxy, $C_1$–$C_4$alkoxy, $C_1$–$C_4$alkylthio, amino, N-$C_1$–$C_4$alkylamino or N,N-di-$C_1$–$C_4$alkylamino, where alkyl may be substituted by sulfo, sulfato, hydroxy, carboxy or phenyl; cyclohexylamino, morpholino, or N—$C_1$–$C_4$alkyl-N-phenylamino or phenylamino or naphthylamino, where phenyl or naphthyl may be substituted by $C_1$–$C_4$alkyl, $C_1$–$C_4$alkoxy, carboxy, sulfo or halogen.

Non-reactive substituents T may suitably be amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or isopropoxy and hydroxy.

A non-reactive substituent T is preferably amino, N-$C_1$–$C_4$alkylamino which is unsubstituted or substituted in the alkyl moiety by hydroxy, sulfato or sulfo, morpholino, phenylamino or N-$C_1$–$C_4$alkyl-N-phenylamino, wherein phenyl is unsubstituted or substituted by sulfo, carboxy, methyl or methoxy.

Further interesting reactive groups are pyrimidine or quinoxaline radicals which each carry at least one group which can be removed as an anion. Typical examples are the 2,3-dichloroquinoxaline-6-carbonylamino radical, the 2,4-dichloropyrimidine-5-carbonylamino radical as well as the radical of formula

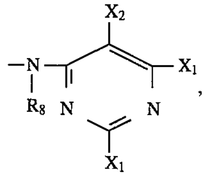
(7)

wherein one of the substituents $X_1$ is a group which can be removed as an anion and the other substituent $X_1$ has the meanings and preferred meanings given in connection with the non-reactive substituents T or is a radical of formulae (6a) to (6e) or is a group which can be removed as an anion, $X_2$ is a negative substituent and $R_8$ independently has the meanings given for formula (5).

The group $X_1$ which can be removed as an anion is preferably fluoro or chloro. Typical examples of suitable substituents $X_2$ are nitro, cyano, $C_1$–$C_4$alkylsulfonyl, carboxy, chloro, hydroxy, $C_1$–$C_4$alkoxysulfonyl, $C_1$–$C_4$alkylsulfinyl, $C_1$–$C_4$alkoxycarbonyl or $C_2$–$C_4$alkanoyl. The preferred meanings of $X_2$ are chloro, cyano and methylsulfonyl.

The cellulosic fibre materials are preferably dyed by a process which comprises dyeing in the presence of 0 to 20 g per liter of a salt of a mineral acid and using at least one reactive dye of formula

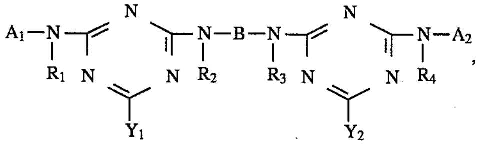
(1)

wherein $A_1$ is the radical of a a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $A_2$ independently of $A_1$ has the meaning of $A_1$ or is hydrogen or is a colourless organic radical, $R_1$, $R_2$, $R_3$ and $R_4$ are each independently of one another hydrogen or unsubstituted or substituted $C_1$–$C_4$alkyl, B is an aliphatic or aromatic linking group, and $Y_1$ and $Y_2$ are each independently of the other fluoro or carboxypyridinium; and

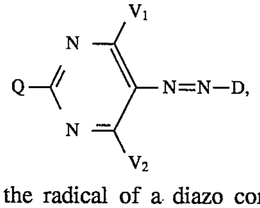
(2)

wherein D is the radical of a diazo component, Q is an unsubstituted or substituted phenyl or naphthyl radical, or an unsubstituted or substituted aromatic-heterocyclic radical, and $V_1$ and $V_2$ are each independently of the other a radical of formula

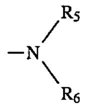
(3)

wherein $R_5$ and $R_6$ are each independently of the other hydrogen, unsubstituted or substituted aryl or unsubstituted or substituted $C_1$–$C_6$alkyl, and alkyl, with the exception of methyl, may be interrupted by —O— or —NR'—, and R' is hydrogen or $C_1$–$C_4$alkyl, or $NR_5R_6$ form a heterocyclic 5- or 6-membered ring which may or may not be further substituted, with the proviso that at least one of $V_1$, $V_2$ and D carries a fibre-reactive group.

A further preferred dyeing process relates to dyeing blends of cellulosic fabrics and polyester fibres in the presence of reactive dyes and disperse dyes, which process comprises dyeing said materials in the presence of 0 to 40 g per liter of a salt of a mineral acid in the temperature range from 80° to 150° C. and at a pH of 5 to 11, and using as reactive dyes at least one of the reactive dyes of the above formulae (1) and (2).

The substituents $A_1$ und $A_2$ in the dye of formula (1) may contain in theft molecule the customary substituents of organic dyes, conveniently those previously indicated in connection with reactive dye chromophores.

A reactive group in the radical $A_1$ or $A_2$ in the dye of formula (1) as well as in the substituent $V_l$, $V_2$ or D in the dye of formula (2) may be one of the fibre-reactive radicals previously indicated.

$A_2$ as a colourless organic radical in the dye of formula (1) may suitably be hydrogen, $C_1$–$C_6$alkyl such as methyl, ethyl, propyl, isopropyl, butyl, isobutyl, sec-butyl or tert-butyl, $C_1$–$C_6$alkyl which is substituted by $C_1$–$C_4$alkoxy, hydroxy, halogen or cyano; cyclohexyl or $C_1$–$C_4$alkyl-substituted cyclohexyl; phenyl or naphthyl which are each unsubstituted or substituted by $C_1$–$C_4$alkyl, $C_1$–$C_4$alkoxy, $C_2$–$C_4$alkanoylamino, benzoylamino, ureido, carboxy, sulfo or halogen; pyridyl, benzothiazolyl, oxazolyl or thiazolyl. Likewise, $A_2$ and $R_4$ in formula (1), together with the linking nitrogen atom, may form a heterocyclic ring, for example piperidyl or morpholyl. Preferably $A_2$ is a dye radical which, independently of $A_1$, has the meanings given above for $A_1$.

Most preferably, $A_1$ and $A_2$ are each independently of the other the radical of a monoazo, disazo or formazan dye, preferably radicals of the following formulae (8a) to (8t):

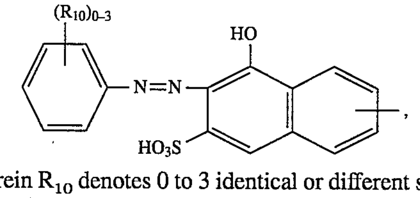
(8a)

wherein $R_{10}$ denotes 0 to 3 identical or different substituents selected from the group consisting of $C_1$–$C_4$alkyl, $C_1$–$C_4$alkoxy, halogen, carboxy and sulfo;

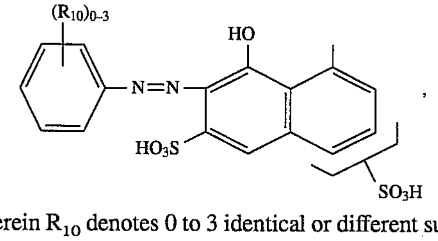
(8b)

wherein $R_{10}$ denotes 0 to 3 identical or different substituents selected from the group consisting of $C_1$–$C_4$alkyl, $C_1$–$C_4$alkoxy, halogen, carboxy and sulfo;

(8c)

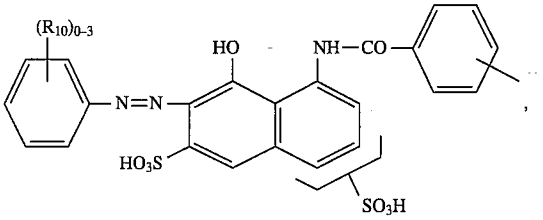

wherein $R_{10}$ denotes 0 to 3 identical or different substituents selected from the group consisting of $C_1$–$C_4$alkyl, $C_1$–$C_4$alkoxy, halogen, carboxy and sulfo;

(8d)

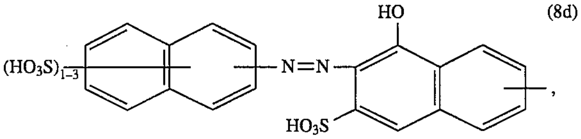

(8e)

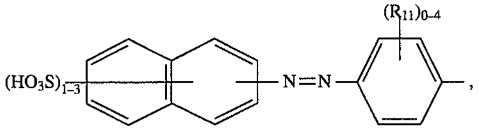

wherein $R_{11}$ denotes 0 to 4 identical or different substituents selected from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxy, carboxy, sulfomethyl and sulfo;

(8f)

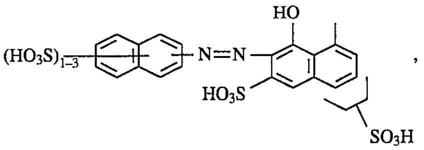

(8g)

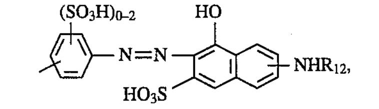

wherein $R_{12}$ is $C_1$–$C_4$alkanoyl or benzoyl;

(8h)

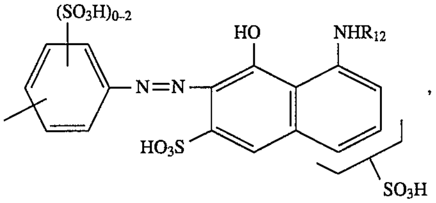

wherein $R_{12}$ is $C_1$–$C_4$alkanoyl or benzoyl;

(8i)

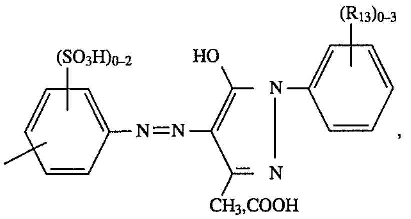

wherein $R_{13}$ denotes 0 to 3 identical or different substituents selected from the group consisting of $C_1$–$C_4$alkyl, $C_1$–$C_4$alkoxy, halogen, carboxy and sulfo;

(8j)

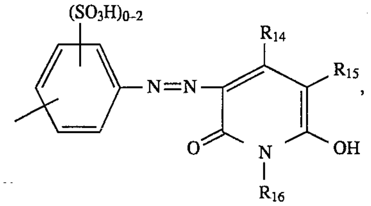

wherein $R_{14}$ and $R_{16}$ are each independently of the other hydrogen, $C_1$–$C_4$alkyl or phenyl, and $R_{15}$ is hydrogen, cyano, carbamoyl or sulfomethyl;

(8k)

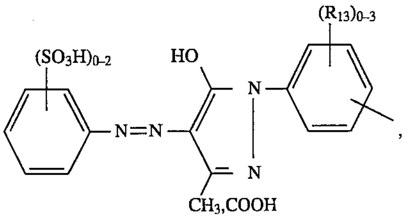

wherein $R_{13}$ denotes 0 to 3 identical or different substituents selected from the group consisting of $C_1$–$C_4$alkyl, $C_1$–$C_4$alkoxy, halogen, carboxy and sulfo;

(8l)

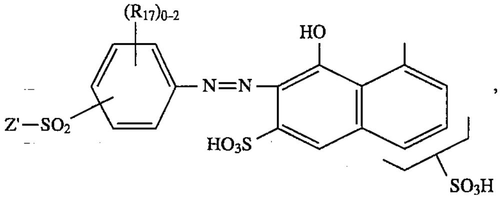

wherein $R_{17}$ denotes 0 to 2 identical or different substituents selected from the group consisting of $C_1$–$C_4$alkyl, $C_1$–$C_4$alkoxy, halogen, carboxy and sulfo; and Z' is β-sulfatoethyl, β-thiosulfatoethyl, β-phosphatoethyl, β-acyloxyethyl, β-haloethyl or vinyl;

(8m)

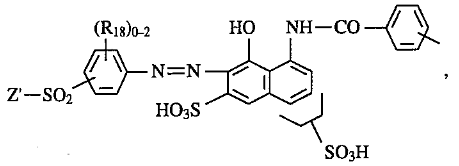

wherein $R_{18}$ denotes 0 to 2 identical or different substituents selected from the group consisting of $C_1$–$C_4$alkyl, $C_1$–$C_4$alkoxy, halogen, carboxy and sulfo; and Z' is β-sulfatoethyl, β-thiosulfatoethyl, β-phosphatoethyl, β-acyloxyethyl, β-halogenethyl or vinyl;

(8n)

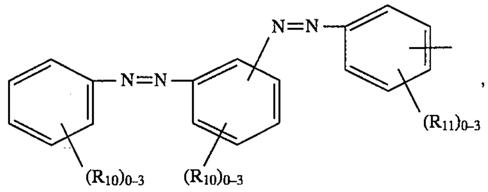

-continued (8o)

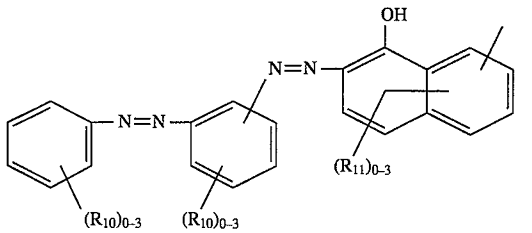

and (8p)

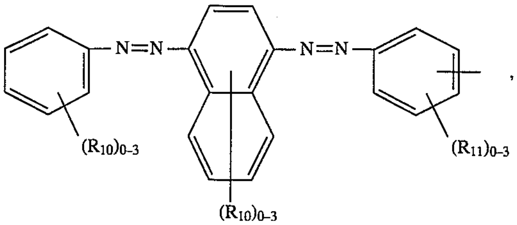

, wherein $R_{10}$ denotes 0 to 3 identical or different substituents selected from the group consisting of $C_1$–$C_4$alkyl, $C_1$–$C_4$alkoxy, halogen, carboxy and sulfo, and $R_{11}$ denotes 0 to 3 identical or different substituents selected from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxy, carboxy, sulfomethyl and sulfo;

(8q)

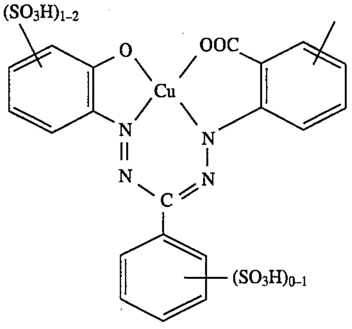

or (8r)

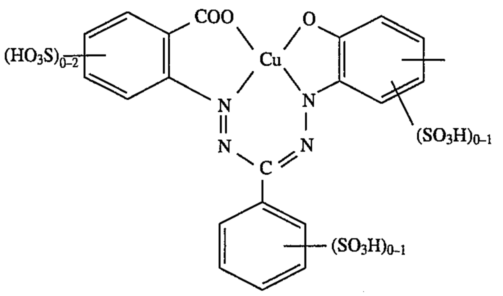

(8s)

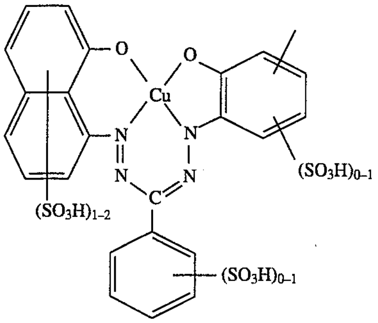

-continued or (8t)

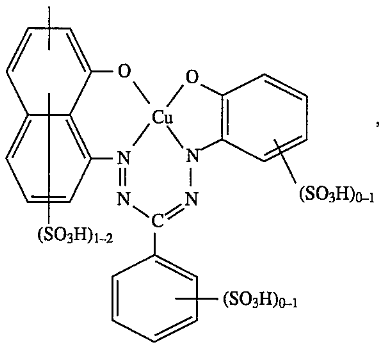

, wherein the benzene nuclei may be further substituted by alkyl of 1 to 4 carbon atoms, alkoxy of 1 to 4 carbon atoms, alkylsulfonyl of 1 to 4 carbon atoms, halogen or carboxy.

Radicals of heavy metal complexes of reactive dyes are also of interest. Heavy metals that form complexes are in particular copper, nickel, cobalt or chromium. Preferred radicals of heavy metal complexes are radicals of copper complex azo dyes, more particularly those of formulae (8a) to (8k), which each contain the copper atom bound through an oxygen atom in ortho-position to the azo bridge.

Illustrative examples of azo dyes which are suitable metal complexes are:

(9a)

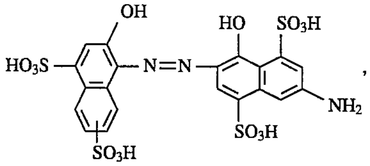

, (9b)

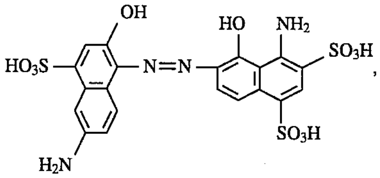

, (9c)

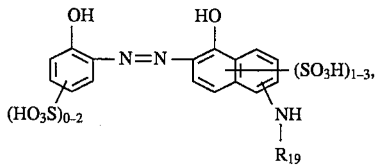

(9d)

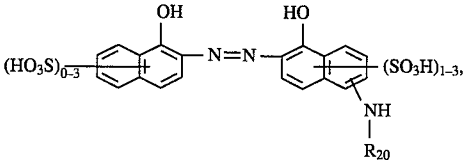

(9e)

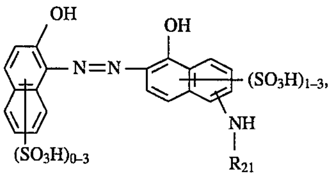

-continued

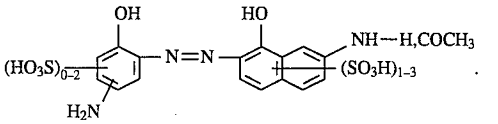

(9f)

Preferred metal atoms are Cu (1:1 complex) or Cr and Co (1:2 complex). Cr and Co complexes can contain the azo compound of the formula above once or twice, i.e they may have a symmetrical structure or an unsymmetrical structure with any other ligand groups.

Preferred copper complexes are typically

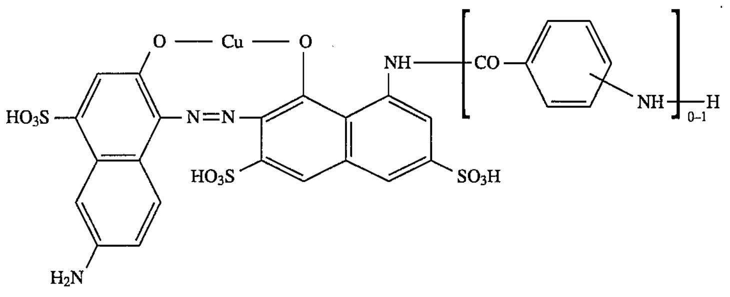

(10a)

and

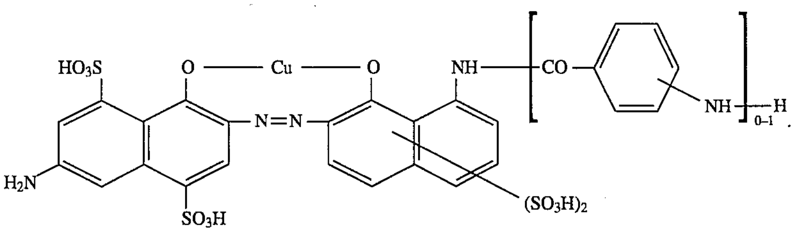

(10b)

In the above formulae, the substituents $R_{19}$ to $R_{21}$ are hydrogen or $C_1$–$C_4$alkyl. Preferably the substituents $R_{19}$ to $R_{21}$ are hydrogen, methyl or ethyl. The aromatic rings in the above dyes of formulae (9a) to (9f) and (10a) and (10b) may be further substituted, the benzene rings preferably by methyl, ethyl, methoxy, ethoxy, methylsulfonyl, ethylsulfonyl, carboxy, acetylamino or chloro, and the naphthalene rings preferably by methoxy, carboxy, acetylamino, nitro or chloro. The benzene rings are preferably not further substituted.

The substituents $A_1$ and $A_2$ in the dye of formula (1) are preferably identical and have the meanings and preferred meanings given above.

The substituents $R_1$, $R_2$, $R_3$ and $R_4$ as alkyl radicals in the dye of formula (1) are straight chain or branched. The alkyl radicals may be further substituted, e.g. by halogen, hydroxy, cyano, $C_1$–$C_4$alkoxy, $C_1$–$C_4$alkoxycarbonyl, carboxy, sulfamoyl, sulfo or sulfato. Illustrative examples of $R_1$, $R_2$, $R_3$ and $R_4$ are methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. $R_1$, $R_2$, $R_3$ and $R_4$ are each independently of one another preferably hydrogen, methyl or ethyl, most preferably hydrogen.

The aliphatic or aromatic linking group B in the dye of formula (1) is preferably a $C_2$–$C_{12}$alkylene radical which may be interrupted by 1, 2 or 3 members selected from the group consisting of —NH—, —N($CH_3$)— or —O—, a $C_5$–$C_9$cycloalkylene radical or phenylene radical which is substituted by $C_1$–$C_4$alkyl, $C_1$–$C_4$alkoxy, $C_2$–$C_4$alkanoylamino, sulfo, halogen or carboxy, or a radical of formula

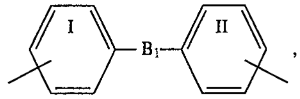

, wherein the benzene rings I and II may be substituted by $C_1$–$C_4$alkyl, $C_1$–$C_4$alkoxy, $C_2$–$C_4$alkanoylamino, sulfo, halogen or carboxy, and $B_1$ is a $C_2$–$C_{10}$alkylene radical which may be interrupted by 1, 2 or 3 oxygen atoms, or wherein $B_1$ is a linking group of formula —CH═CH—, —N═N—, —NH—, —CO—, —NH—CO—, —NH—CO—NH—, —O—, —S— or —$SO_2$—, preferably —CH═CH— or —NH—CO—.

Most preferably, the linking group B in the dye of formula (1) is a radical of formula —$(CH_2)_{2-6}$—, cyclohexylene or $C_1$–$C_4$alkyl-substituted cyclohexylene, phenylene or phenylene which is substituted by $C_1$–$C_4$alkyl, $C_1$–$C_4$alkoxy, $C_2$–$C_4$alkanoylamino, sulfo, halogen or carboxy, or a radical of formula

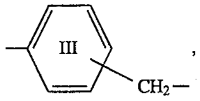

, wherein the benzene ring III may be substituted by $C_1$–$C_4$alkyl, $C_1$–$C_4$alkoxy, $C_2$–$C_4$alkanoylamino, sulfo, halogen or carboxy.

The substituents $Y_1$ and $Y_2$ in the dye of formula (1) are each independently of the other preferably fluoro or carboxypyridinium, preferably fluoro.

D in the dye of formula (2) is the radical of an aminobenzene, aminonaphthalene, phenylazoaminobenzene, naphthylazoaminobenzene, phenylazoaminonaphthalene or naphthylazoaminonaphthalene, each of which is unsubstituted or preferably substituted as indicated below. Preferably D is an unsubstituted or substituted radical of an aminobenzene or aminonaphthalene.

Suitable substituents of the radical D are typically: alkyl groups of 1 to 4 carbon atoms such as methyl, ethyl, propyl, isopropyl or butyl, alkoxy groups of 1 to 4 carbon atoms such as methoxy, ethoxy, propoxy, isopropoxy or butoxy, amino, N-mono- or N,N-di-$C_1$–$C_4$alkylamino in which alkyl may be further substituted by —OH, —$OCOCH_3$, —$OSO_3H$, —CN or halogen, e.g. methylamino, ethylamino, n- or isopropylamino or n-, sec- or tert-butylamino, N,N-dimethylamino or diethylamino, β-chloroethylamino, β-cyanoethylamino, β-acetyloxyethylamino, N-(β-hydroxyethyl)-N-ethylamino, β-sulfatoethylamino, N,N-di-(β-hydroxyethyl)amino, N,N-di-(β-sulfatoethyl)amino or hydroxypropylamino, phenylamino, $C_1$–$C_4$alkanoylamino, preferably acetylamino or propionylamino, benzoylamino, $C_1$–$C_4$alkoxycarbonyl, e.g. methoxycarbonyl or ethoxycarbonyl, nitro, cyano, trifluoromethyl, halogen such as fluoro, chloro or bromo, hydroxy, carboxy, sulfo, sulfomethyl, sulfamoyl, N-mono- or N,N-di-$C_1$–$C_4$alkylsulfamoyl, N-phenylsulfamoyl, carbamoyl, N-mono- or N,N-di-$C_1$–$C_4$alkylcarbamoyl, ureido, $C_1$–$C_4$alkylsulfonyl, e.g. methylsulfonyl or ethylsulfonyl. In addition, the radical D may be substituted by reactive groups. Suitable reactive groups are those cited above as substituents of $A_1$ and $A_2$, in which case the indicated meanings and preferred meanings are applicable.

$R_5$ or $R_6$ as a $C_1$–$C_6$alkyl radical in the dye of formula (2) may suitably be methyl, ethyl, n- or isopropyl-, n-, sec- or tert-butyl or straight chain or branched pentyl or hexyl, which radicals may be substituted by hydroxy, sulfo, sulfato, carboxy, cyano, halogen, $C_1$–$C_4$alkoxycarbonyl, $C_1$–$C_4$alkanoyloxy, carbamoyl or a reactive radical, and the alkyl radical, with the exception of methyl, may be interrupted by —O— or —NR'—, and R' is hydrogen or $C_1$–$C_4$alkyl.

If the alkyl radical $R_5$ or $R_6$ is substituted by a reactive group, then it may be one of the aformentioned reactive groups. The radical of formula —$SO_2$—Z, wherein Z has the meanings and preferred meanings previously given, is preferred.

$R_5$ and $R_6$ as alkyl radical are each independently of the other preferably hydrogen or a $C_1$–$C_4$alkyl radical which is unsubstituted or substituted by hydroxy, sulfo, sulfato, carboxy, cyano or the group —$SO_2$—Z, and may be interrupted by —O—. Preferably one of $R_5$ and $R_6$ is hydrogen.

Illsutrative examples of particularly preferred non-reactive alkylamino radicals $V_1$ and $V_2$ are: —NH—$CH_3$, —NH—$CH_2$—$SO_3H$, —NH—$CH_2$—COOH, —NH—$C_2H_5$, —NH—$CH_2$—$CH_2$—OH, —NH—$CH_2$—$CH_2$—$SO_3H$, —NH—$CH_2$—$CH_2$—$OSO_3H$, —NH—$CH_2$—$CH_2$—CN, —NH—$CH_2$—$CH_2$—COOH, —NH—$CH_2$—$CH_2$—$CH_2$—$OSO_3H$, —NH—$CH_2$—$CH_2$—$CH_2$—OH, —NH—$CH_2$—CH(OH)—$CH_2$—$CH_3$, —NH—$CH_2$—$CH_2$—O—$CH_2$—$CH_2$—OH, —NH—$CH_2$—$CH_2$—O—$CH_2$—$CH_2$—$OSO_3H$.

A heterocyclic radical formed by $NR_5R_6$ may be a piperidinyl, piperazinyl or pyrrolidinyl radical, each of which is unsubstituted or substituted by a radical of formula -$(alk)_p$—$SO_2$—Z, wherein alk is $C_1$–$C_6$alkylene, p is 0 or 1 and Z has the meanings and preferred meanings previously given.

$R_5$ and $R_6$ as an aryl radical may typically be a phenyl or naphthyl radical which is unsubstituted or substituted by sulfo, carboxy, $C_1$–$C_4$alkyl, $C_1$–$C_4$alkoxy, halogen, a reactive radical or a group —N═N—K, in which K is the radical of a coupling component of the benzene or naphthalene series or of the heterocyclic series.

K is preferably the radical of a benzene, naphthalene, 1-phenyl-5-pyrazolone or pyridone, which may be substituted by one or more than one identical or different substituent as indicated previously for D.

K most preferably corresponds to one of the following formulae:

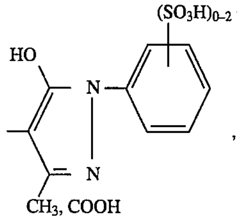

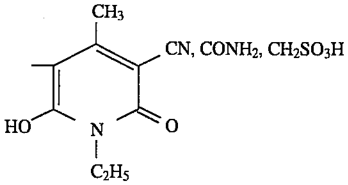

and

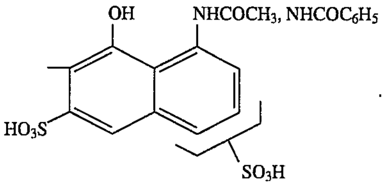

Most preferably, $R_5$ and $R_6$ in the dye of formula (2) are each independently of the other hydrogen or a phenyl or naphthyl radical which is unsubstituted or substituted by sulfo, carboxy, $C_1$–$C_4$alkyl, $C_1$–$C_4$alkoxy, halogen, a reactive radical or a group —N═N—K, wherein K is the radical of a coupling component of the benzene or naphthalene series or of the heterocyclic series, a $C_1$–$C_6$alkyl radical which is unsubstituted or substituted by hydroxy, sulfo, sulfato, carboxy, cyano, halogen, $C_1$–$C_4$alkoxycarbonyl, $C_1$–$C_4$alkanoyloxy, carbamoyl or a reactive radical of formula —$SO_2$—Z, in which Z has the meanings and preferred meanings previously given, alkyl, with the exception of methyl, may be interrupted by —O— or —NR'—, and R' is hydrogen or $C_1$–$C_4$alkyl, or $NR_5R_6$ form a piperidinyl, piperazinyl or pyrrolidinyl radical which is unsubstituted or substituted by a radical of formula -$(alk)_p$—$SO_2$—Z, wherein alk is $C_1$–$C_6$alkylene, p is 0 or 1 and Z has the meanings and preferred meanings previously given.

With respect to K as well as to the reactive group cited as substituent of the phenyl and naphthyl radicals, the meanings and preferred meanings previously indicated are applicable.

Most preferably, $V_1$ and $V_2$ in the dye of formula (2) are a radical of formula (3), wherein $R_5$ and $R_6$ are each independently of the other hydrogen or a $C_1$–$C_6$alkyl radical which is unsubstituted or substituted by hydroxy, sulfo, sulfato, carboxy, cyano or the group —$SO_2$—Z, and alkyl, with the exception of methyl, may be interrupted by —O— or —NR', and R' and Z have the meanings and preferred meanings given previously, or phenyl or naphthyl which are each unsubstituted or substituted by $C_1$–$C_4$alkyl, $C_1$–$C_4$alkoxy, $C_2$–$C_4$alkanoylamino, sulfo, halogen or carboxy. In particular, at least one of $V_1$ and $V_2$ is a group —$SO_2$—Z.

Q in the dye of formula (2) is preferably phenyl or phenyl which is substituted by $C_1$–$C_4$alkyl, $C_1$–$C_4$alkoxy, $C_2$–$C_4$alkanoylamino, $C_1$–$C_4$alkoxycarbonyl, $C_1$–$C_4$alkylsulfonyl, halogen, sulfo, trifluoromethyl, nitro or cyano, or is 1- or 2-naphthyl or furanyl, thienyl or benzthiazolyl.

Most preferably Q in the dye of formula (2) is unsubstituted phenyl or phenyl which is substituted by methyl, trifluoromethyl, methoxy, sulfo, nitro, chloro or bromo, and is in particular unsubstituted phenyl.

It is preferred to use for the dyeing process dyes of formula (2) that contain in the radical $V_1$, $V_2$ or D at least one reactive group of formula (4), (4a), (4b), (4c), (4d), (4e) or (5), where T in the radical of formula (5) is a group of formula (6a), (6b), (6c), (6d) or (6e).

Very particularly preferred dyes of formula (2) are those that contain in the radical $V_1$, $V_2$ or D, preferably in the radical $V_1$ or $V_2$, at least one reactive group of formula (4).

A preferred embodiment of the dyeing process comprises the use of a dye of formula (1), wherein $A_1$ and $A_2$ are each independently of the other the radical of a monoazo, disazo or formazan dye, B is a $C_2$–$C_{12}$alkylene which may be interrupted by 1, 2 or 3 members selected from the group consisting of —NH—, —$N(CH_3)$— or —O—, a $C_5$–$C_9$cycloalkylene or phenylene radical which is unsubstituted or substituted by $C_1$–$C_4$alkyl, $C_1$–$C_4$alkoxy, $C_2$–$C_4$alkanoylamino, sulfo, halogen or carboxy, or a radical of formula

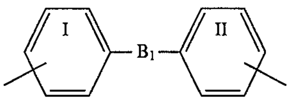

wherein the benzene rings I and II may be substituted by $C_1$–$C_4$alkyl, $C_1$–$C_4$alkoxy, $C_2$–$C_4$alkanoylamino, sulfo, halogen or carboxy, and $B_1$ is a $C_2$–$C_{10}$alkylene radical which may be interrupted by 1, 2 or 3 oxygen atoms, or $B_1$ is a linking group of formula —CH=CH—, —N=N—, —NH—, —CO—, —NH—CO—, —NH—CO—NH—, —O—, —S— or —$SO_2$—, $R_1$, $R_2$, $R_3$ and $R_4$ are each independently of one another methyl or ethyl, and $Y_1$ and $Y_2$ are each independently of the other fluoro or carboxypyridinium, or a dye of formula (2), wherein D is the radical of an unsubstituted or substituted aminobenzene, aminonaphthalene, phenylazoaminobenzene, naphthylazoaminobenzene, phenylazoaminonaphthalene or naphthylazoaminonaphthalene, Q is phenyl or phenyl which is substituted by $C_1$–$C_4$alkyl, $C_1$–$C_4$alkoxy, $C_2$–$C_4$alkanoylamino, $C_1$–$C_4$alkoxycarbonyl, $C_1$–$C_4$alkylsulfonyl, halogen, sulfo, trifluoromethyl, nitro or cyano, or is 1- or 2-naphthyl or furanyl, thienyl or benzothiazolyl, and $V_1$ and $V_2$ are a radical of formula (3), wherein $R_5$ and $R_6$ are each independently of the other hydrogen, phenyl or naphthyl which are unsubstituted or substituted by $C_1$–$C_4$alkyl, $C_1$–$C_4$alkoxy, $C_2$–$C_4$alkanoylamino, sulfo, halogen or carboxy, or a $C_1$–$C_6$alkyl radical which is unsubstituted or substituted by hydroxy, sulfo, sulfato, carboxy, cyano or the group —$SO_2$—Z, and alkyl, with the exception of methyl, may be interrupted by —O— or —NR'—, R' is hydrogen or $C_1$–$C_4$alkyl, Z is a radical of formula —$CH$=$CH_2$ or —$CH_2CH_2$—Y, and Y is a group of formula —Cl, —$OSO_3H$, —$SSO_3H$, —OCO—$CH_3$, —OCO—$C_6H_5$ or —$OPO_3H_2$, with the proviso that at least one of $V_1$ and $V_2$ contains a group —$SO_2$—Z.

Preferably $A_1$ and $A_2$ in the dye of formula (1) and D in the dye of formula (2) do not contain a reactive group.

A very particularly preferred embodiment of the dyeing process comprises the use of a dye of formula (1) to which the meanings and preferred meanings indicated above apply.

The dyes of formulae (1) and (2) are either in the form of their free acids or, preferably, in the form of their salts, conveniently in the form of the alkali metal salts, alkaline earth metal salts or ammonium salts or salts of an organic amine. Typical examples are the sodium, potassium, lithium or ammonium salts or the salt of triethanolamine.

The dyes of formulae (1) and (2) are known or can be prepared by methods analogous to those for preparing known dyes. For example, dyes of formula (1) are disclosed, inter alia, in GB-A-1 529 645 and dyes of formula (2), inter alia, in EP-A-298 041.

By salts of mineral acids are meant typically alkali metal or alkaline earth metal halides as well as alkali metal or alkaline earth metal sulfates, for example lithium, sodium or potassium chlorides and sulfates. Preferably they are alkali metal or alkaline earth metal chlorides or alkali metal or alkaline earth metal sulfates, most preferably sodium chloride or sodium sulfate.

An important embodiment of the process for dyeing cellulosic fibre materials comprises carrying out dyeing in the presence of an amount of a salt of a mineral acid that depnds on the total amount of the dye used. Thus for dyeing in light shades, an amount of 0 to 5 g, preferably of 0.01 to 5 g, per liter of dyebath, is used; for dyeing in medium shades an amount of 5 to 10 g and, for dyeing in deep shades, an amount of 10 to 20 g, is used. By light shades are meant those wherein the amount of dye used for dyeing is less than 1 percent by weight, based on the weight of the material to be dyed. Medium shades will be understood as meaning those wherein the amount of dye is from 1 to 3 percent by weight; and deep shades are those wherein the amount of dye used is greater than 3 percent by weight, preferably greater than 3 percent by weight and up to 10 percent by weight.

It is, however, also possible to dispense entirely with the addition of a salt of a mineral acid, e.g. an alkali metal halide or alkali metal sulfate. This omission has been found especially advantageous for dyeing in light shades.

A particularly preferred embodiment of the dyeing process comprises dyeing in the presence of an amount of 0 to 10 g, preferably 0.01 to 10 g, of a salt of a mineral acid per liter of dyebath. In this embodiment too dyeing can be carried out in the presence of an amount of a salt of a mineral acid that depends on the total amount of dye used. Thus for dyeing in light shades, an amount of a salt of a mineral acid of 0 to 5 g, preferably of 0.01 to 5 g, per liter of dyebath, is used and, for dyeing in deeper shades, an amount of 5 to 10 g is used. Light shades in this context are as defined above and the deeper shades correspond to amounts of dye of 1 percent by weight or greater, preferably 1 percent by weight to 10 percent by weight, preferably 1 percent by weight to 6 percent by weight.

For the dyeing process, the amounts in which the reactive dyes are added to the dyebaths will vary depending on the desired depth of shade. In general, amounts of 0.01 to 10 percent by weight, preferably 0.01 percent by weight to 6 percent by weight, have been found useful.

The dye liquors may contain the standard additives, typically aqueous solutions of alkali metal hydroxides, urea, thickeners such as alginate thickeners, water-soluble cellulose alkyl ethers, methyl cellulose, starch ethers, emulsion thickeners, preferably an alginate such as sodium alginate, as well as dispersants, levelling agents, wetting agents, migration inhibitors, and also sodium m-nitrobenzenesulfonate.

It is preferred to carry out the process for dyeing cellulosic fibre materials by the exhaust process. In this process, dyeing is usually carded out in aqueous medium at a liquor to goods ratio of 1:2 to 1:60, preferably of 1:5 to 1:20.

Dyeing is conveniently carried out in the temperature range from 20° to 100° C., preferably from 40° to 90° C. and, most preferably, from 60° to 80° C.

In the preferred dyeing process, the customary addition of large amounts of a salt of a mineral acid, e.g. 50 to 100 g/l, can be dispensed with, thereby reducing the contamination of the wastewater and achieving a greater efficiency of the process.

As already noted above, besides dyeing cellulosic fibre materials, dyeing blends of cellulosic fabrics and polyester is also of interest.

Suitable disperse dyes for the process for dyeing blended fabrics are the standard disperse dyes listed, inter alia, in the Colour Index, 3rd Edition (1971) Vol. 2, on pages 2479 to 2742.

Suitable cellulosic fibre materials are typically natural cellulose fibres such as cotton, linen and hemp, as well as cellulose and regenerated cellulose. It is particularly preferred to dye polyester/cotton blends.

The process for dyeing blended fabrics lends itself in particular to the exhaust method, preferably to exhaust dyeing by a single step, one-bath process.

Dyeing is in this case carried out in the temperature range from 90° to 140° C., preferably from 100° to 130° C. and, most preferably, from 110° to 130° C. The pH range is preferably from 6 to 10, most preferably from 6 to 8.

A preferred embodiment of the process for dyeing blended fabrics comprises dyeing polyester cotton blends in the temperature range from 90° to 140° C. and in the pH range from 6 to 10 in a single step, one-bath process by the exhaust method.

An important embodiment of the process for dyeing blended fabrics comprises dyeing said blends in the presence of an amount of a salt of a mineral acid of 0 to 30 g, preferably 0 to 20 g, per liter of dyebath.

For dyeing blended fabrics, the particulars and preferences indicated above apply to the reactive dyes of formulae (1) and (2). With respect to the possible auxiliaries and the liquor ratio, the dye liquors correspond to those described above in connection with the dyeing of cellulosic fibre materials. As regards the salts of a mineral acid, the particulars and preferences stated above apply.

In the preferred dyeing processes it is possible to dispense with the normal customary addition of large amounts of alkali metal hydroxides for fixing the reactive dyes. Smaller amounts of salts of a mineral acid can also be used, resulting in a reduction of wastewater contamination as well as in simpler treatment of the fabric after the dyeing process.

The wash process of this invention is conveniently carried out subsequent to the dyeing or printing process as an aftertreatment. The procedure conveniently comprises removing the dye liquor and first rinsing the fibre material with water. Afterwards the cellulosic fibre material is treated in a fresh liquor containing at least one novel washing-off formulation in the temperature range from e.g. 50° to 100° C., preferably from 60° to 100° C. and, most preferably, at boiling temperature, i.e. in the temperature range from c. 90° to 100° C. The amount of washing-off formulation added will depend on the water hardness and is usually e.g. ≧0.25 g/l, preferably 0.25 to 5 g/l, and, most preferably, 0.5 to 2 g/l, of wash liquor. The fibre material is thereafter removed from the wash liquor and conveniently rinsed with fresh water until the wash liquor components have been completely removed.

By means of the inventive process it is possible to remove unfixed dye rapidly and completely from the fibre material. Accordingly, dyeings and prints having excellent fastness properties are obtained. The wetfastness and rubfastness properties in particular are substantially enhanced by using the novel washing-off process and the white ground is not stained when producing coloured prints.

In the following Examples parts and percentages are by weight, unless othewise indicated.

Preparation of the Washing-Off Formulations

EXAMPLE 1

A homogeneous anhydrous mixture of 125 g of polyvinyl pyrrolidone (e.g. Luviskol® K 30) and 875 g of sodium metasilicate is prepared in a ball mill.

An aqueous formulation of this powder mixture can be prepared prior to use; but in use the product can also be added direct to the wash liquor.

EXAMPLE 1a

A homogeneous anhydrous mixture of 18.75 g of polyvinyl pyrrolidone (e.g. Luviskol® K 30) and 130.5 g of sodium metasilicate is prepared and then processed to a homogeneous mixture with 0.75 g of a dust inhibitor comprising as main components paraffin oil and a mixture of oleyl polyglycol ethers.

An aqueous formulation of this powder mixture can be prepared prior to use; but in use the product can also be added direct to the wash liquor.

EXAMPLE 1b

A homogeneous anhydrous mixture of 37.5 g of polyvinyl pyrrolidone (e.g. Luviskol® K 30) and 111.75 g of sodium metasilicate is prepared and then processed to a homogeneous mixture with 0.75 g of the dust inhibitor in accordance with Example 1a).

An aqueous formulation of this powder mixture can be prepared prior to use, but in use the product can also be added direct to the wash liquor.

EXAMPLES 1c–1f

Washing-off formulations with comparable properties are obtained by replacing in Example 1a the polyvinyl pyrrolidone homopolymer with the equivalent amount of one of the polyvinyl pyrrolidone copolymers listed in the Table:

| | |
|---|---|
| 1c | copolymer of 70% by weight of vinyl pyrrolidone and 30% by weight of vinyl acetate (e.g. Luviskol ® VA 73 E) |
| 1d | copolymer of 50% by weight of vinyl pyrrolidone and 50% by weight of vinyl acetate (e.g. Luviskol ® 55 E) |
| 1e | copolymer of 60% by weight of vinyl pyrrolidone and 40% by weight of vinyl acetate (e.g. Luviskol ® VA 64) |
| 1f | copolymer of 30% by weight of vinyl pyrrolidone and 70% by weight of vinyl acetate (e.g. Luviskol ® 37 E) |

EXAMPLES 1g–1m

Washing-off formulations with comparable properties are obtained by replacing in Example 1a the sodium metasilicate with the equivalent amount of one of the water softeners listed in the Table:

| | |
|---|---|
| 1g | sodium sheet silicate (δ-$Na_2Si_2O_5$ crystalline) |
| 1h | Na—Al silicate, zeolite A |
| 1i | polymaleic acid (e.g. Belclene ® 200) |
| 1j | copolymer of maleic anhydride and methyl vinyl ether, sodium salt (e.g. Sokalan ® CP 2) |
| 1k | copolymer of maleic acid and acrylic acid, sodium salt (e.g. Sokalan ® CP 5) |
| 1l | copolymer of maleic acid and olefin, sodium salt (e.g. Sokalan ® CP 9) |

-continued

| |
|---|
| 1m modified polyacrylic acid, sodium salt (e.g. Sokalan ® CP 10) |

Use Examples

EXAMPLE 2

2 parts of a yellow dyeing reactive dye of formula

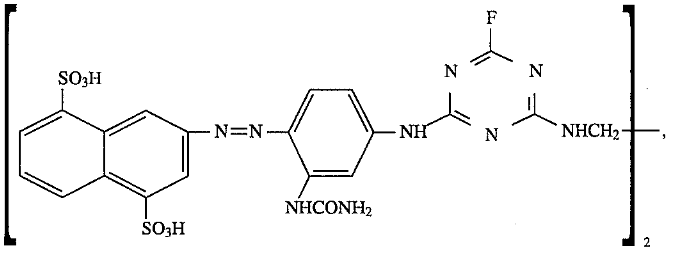

(101)

1 part of a red dyeing reactive dye of formula

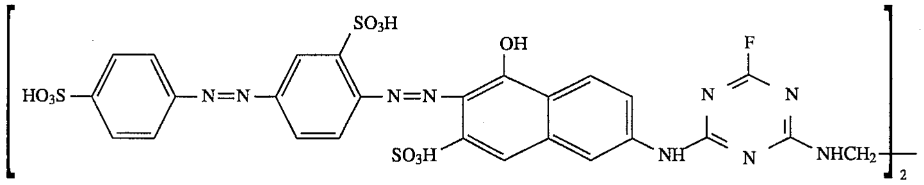

(102)

0.5 part of a blue dyeing reactive dye of formula

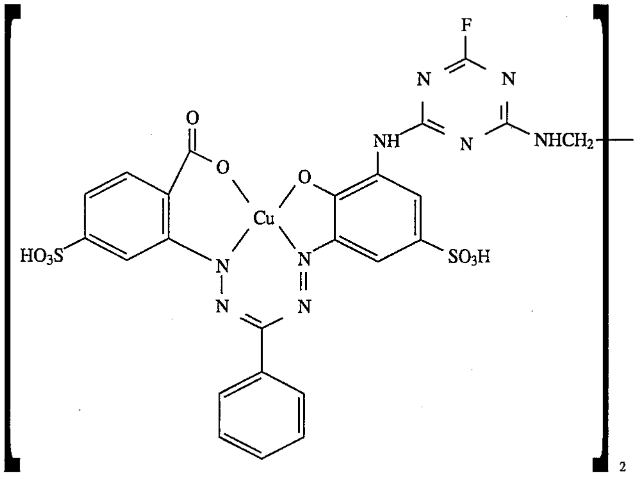

(103)

are dissolved in 1000 parts of water with the addition of 10 parts of sodium chloride at a temperature of c. 70° C. Into this dyebath are put 100 parts of cotton fabric and the temperature is kept for c. 50 minutes at 70° C. Afterwards 10 parts of calcined sodium carbonate and 3 parts of sodium hydroxide (30%) are added. The temperature is kept for a further 50 minutes at 70° C. The liquor is then drawn off and the cotton fabric is rinsed for c. 10 minutes with cold water.

The dyed cotton fabric is afterwards treated in a fresh liquor containing 2 g/l of the washing-off formulation of Example 1, then treated for 20 minutes at boiling temperature (c. 98° C.), afterwards rinsed with cold water and dried, giving a cotton fabric which is dyed in a brown shade of good fastness properties, especially good wetfastness properties.

Comparably good results are obtained by replacing the washing composition of Example 1 with an equivalent amount of the washing-off formulation of one of Examples 1a to 1m.

EXAMPLE 3

0.2 part of the yellow dyeing reactive dye of formula (101), 0.025 part of the red dyeing reactive dye of formula (102) and 0.05 part of the blue dyeing reactive dye of formula (103) are dissolved in 1000 parts of water with the addition of 5 parts of sodium sulfate at a temperature of c. 70° C. Into this dyebath are put 100 parts of cotton fabric and the temperature is kept for c. 50 minutes at 70° C. Afterwards 10 parts of calcined sodium carbonate and 3 parts of sodium hydroxide (30%) are added. The temperature is kept for a further 50 minutes at 70° C. The liquor is then drained off and the cotton fabric is rinsed for c. 10 minutes with cold water.

The dyed cotton fabric is afterwards treated in a fresh liquor containing 1 g/l of the washing-off formulation of Example 1a, then treated twice for 10 minutes at boiling temperature (c. 98° C.), afterwards rinsed with cold water and dried, giving a cotton fabric which is dyed in a light brown shade of good fastness properties, especially good wetfastness properties.

Cotton fabric dyed in a light brown shade is also obtained by repeating the above procdure, but replacing 5 parts of sodium sulfate with 1, 2 or 4 parts of 5 parts of sodium sulfate or with 1, 2, 4 or 5 parts of sodium chloride Comparably good results are obtained by replacing the washing composition of Example 1a with an equivalent amount of the washing-off formulation of one of Examples 1 or 1b to 1m.

EXAMPLE 4

1.5 parts of the orange dyeing reactive dye of formula

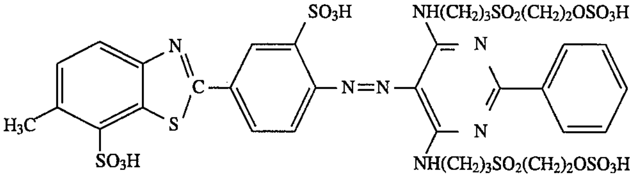

are dissolved in 1000 parts of water with the addition of 6 parts of sodium sulfate at a temperature of c. 70° C. Into this dyebath are put 100 parts of cotton fabric and the temperature is kept for c. 50 minutes at 70° C. Afterwards 10 parts of calcined sodium carbonate and 3 parts of sodium hydroxide (30%) are added. The temperature is kept for a further 50 minutes at 70° C. The liquor is then drained off and the cotton fabric is rinsed for c. 10 minutes with cold water.

The dyed cotton fabric is afterwards treated in a fresh liquor containing 1.5 g/l of the washing-off formulation of Example 1a, then treated for 20 minutes at boiling temperature (c. 98° C.), afterwards rinsed with cold water and dried, giving a cotton fabric which is dyed in an orange shade of good fastness properties, especially good wetfastness properties.

Cotton fabric dyed in an orange shade of good allround fastness properties is also obtained by repeating the above procdure, but replacing 6 parts of sodium sulfate with 5, 5.5, 7, 9.5 or 10 parts of sodium sulfate or with 5, 5.5, 7, 9.5 or 10 parts of sodium chloride.

Comparably good results are obtained by replacing the washing-off formulation of Example 1a with an equivalent amount of the washing-off formulation of one of Examples 1 or 1b to 1m.

EXAMPLE 5

2.5 parts of the red dyeing reactive dye of formula (102) and 2.5 parts of the blue dyeing reactive dye of formula

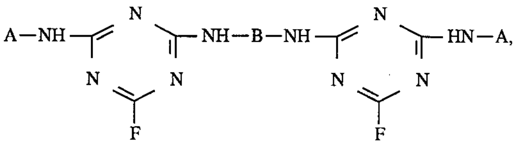

wherein B is a linking group of formula $—CH_2CH_2—$ and A is a radical of formula

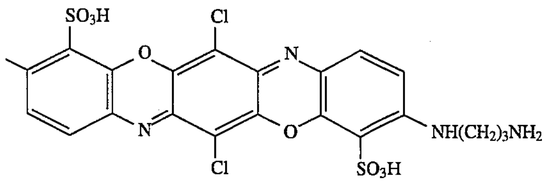

are dissolved in 1000 parts of water with the addition of 10 parts of sodium sulfate at a temperature of c. 70° C. Into this dyebath are put 100 parts of cotton fabric and the temperature is kept for c. 50 minutes at 70° C. Afterwards 10 parts of calcined sodium carbonate and 3 parts of sodium hydroxide (30%) are added. The temperature is kept for a further 50 minutes at 70° C. The liquor is then drained off and the cotton fabric is rinsed for c. 10 minutes with cold water.

The dyed cotton fabric is afterwards treated in a fresh liquor containing 2 g/l of the washing-off formulation of Example 1b, then treated for 20 minutes at boiling temperature (c. 98° C.), afterwards rinsed with cold water and dried, giving a cotton fabric which is dyed in a dark violet shade of good fastness properties, especially good wetfastness properties.

Cotton fabric dyed in a dark violet shade of good allround fastness properties is also obtained by repeating the above procedure, but replacing 10 parts of sodium sulfate with 11, 15, 17 or 20 parts of sodium sulfate or with 11, 15, 17 or 20 parts of sodium chloride.

Comparably good results are obtained by replacing the washing composition of Example 1a with an equivalent amount of the washing composition of one of Examples 1 or 1b to 1m.

EXAMPLE 6

0.125 part of a yellow dyeing reactive dye of formula (101), 0.125 part of a red dyeing reactive dye of formula (102), 0.125 part of a blue dyeing reactive dye of formula (103), 0.075 pan of a yellow dyeing disperse dye of formula (104)

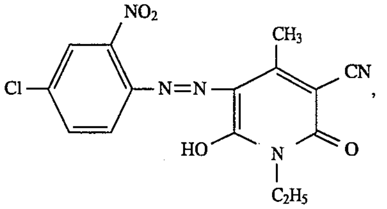

0.075 part of a red dyeing disperse dye of formula (105)

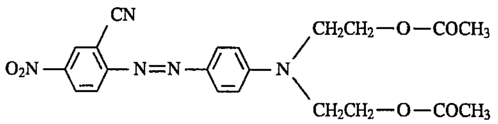

and 0.075 pan of a blue dyeing disperse dye of formula

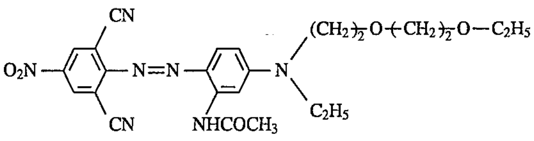

(106)

are dissolved or dispersed in 300 parts of deionised water. Then 0.2 part of an anionic dispersant and 40 g/l of sodium sulfate are added and the pH is adjusted to 7 with disodium hydrogenphosphate buffer. Into this dyebath are put 25 parts of a polyester/cotton blend (50/50) and the dyebath is heated at a rate of 1.5° C./minute to a temperature of 130° C. and kept for 30 minutes at this temperature. After cooling to a temperature of c. 80° C., the liquor is drained off and the blend is rinsed for c. 10 minutes with cold water.

The dyed blend is afterwards treated in a fresh liquor containing 2 g/l of the washing composition of Example 1, then treated for 20 minutes at boiling temperature (c. 98° C.), afterwards rinsed with cold water and dried, giving a polyester/cotton blend which is dyed in a brown shade of good fastness properties.

EXAMPLE 7

10 parts of cotton fabric (bleached and mercerised) are put at c. 30° C. into a dyebath containing 200 parts of water and 0.35 part of the dye of formula

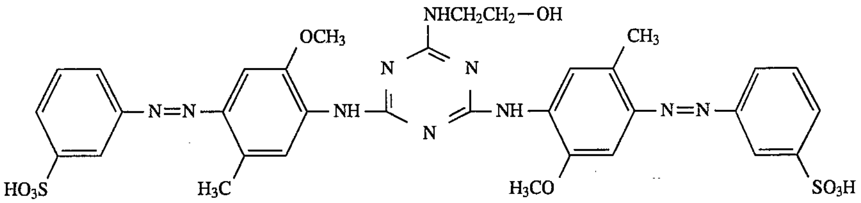

The liquor is heated over 30 minutes to 95° C. and kept for 15 minutes at this temperature. Then 4 parts of sodium sulfate are added and dyeing is continued for a further 45 minutes at 95° C. Afterwards the dyebath is cooled over 15 minutes to 80° C. and kept for 15 minutes at this temperature. The liquor is then drained off and the fabric is rinsed for c. 10 minutes with cold water.

The cotton fabric is afterwards treated in a fresh liquor containing 2 g/l of the washing-off formulation of Example 1a, then treated for 20 minutes at boiling temperature (c. 98° C.), afterwards rinsed with cold water and dried, giving a polyester/cotton blend which is dyed in a greenish-yellow shade of good fastness properties.

Comparably good results are obtained by replacing the washing-off formulation of Example 1a with an equivalent amount of the washing-off formulation of one of Examples 1 or 1b to 1m.

EXAMPLE 8

3 parts of the reactive dye of formula

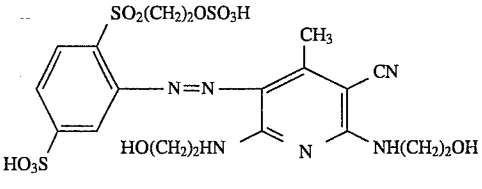

are stirred rapidly into 100 parts of a stock thickening comprising 50 parts of 5% sodium alginate thickener, 27.8 parts of water, 20 parts of urea, 1 part of sodium m-nitrobenzenesulfonate as well as 1.2 parts of sodium hydrogencarbonate. A cotton fabric is printed with this print paste and the printed fabric is steamed in saturated steam for 2 minutes at 102° C. The printed fabric is then rinsed with cold water.

The printed fabric is afterwards treated in a fresh liquor containing 2 g/l of the washing composition of Example 1b, then treated for 20 minutes at boiling temperature (c. 98° C.), afterwards rinsed with cold water and dried, giving a polyester/cotton blend which is printed in an orange shade of good fastness properties.

EXAMPLES 9-12

Comparably good results are obtained by carrying out the procedure of Example 2 and replacing the dye mixture described therein with an equivalent amount of the reactive dyes listed in the following Table.

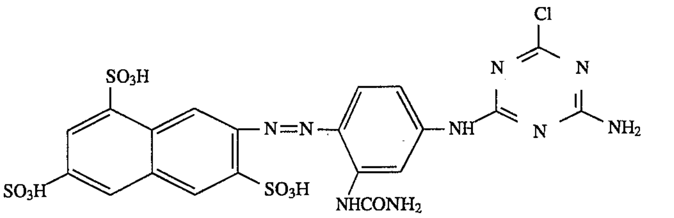

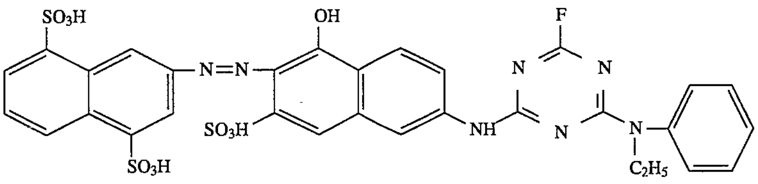

the dye mixture comprising the dyes of formulae

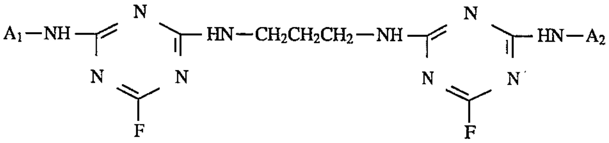

and

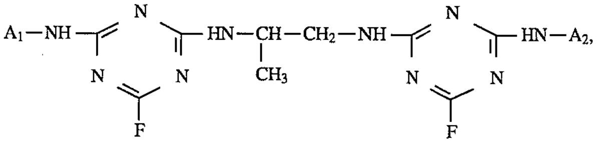

wherein $A_1$ and $A_2$ are each a radical of formula

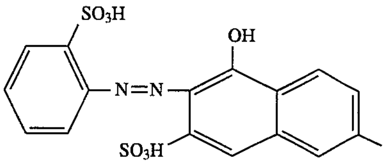

in the ratio of c. 1:1.

The mixture can be prepared as follows: 14 parts of cyanuric fluoride are added dropwise to a neutral solution of 42 parts of 7-amino-4-hydroxy-3-(2-sulfophenylazo)naphthalene- 2-sulfonic acid and 5 parts of disodium hydrogenphosphate in 500 parts of water at a temperature below 2° C., while keeping the pH constant by the addition of an aqueous solution of sodium hydroxide. Upon completion of the reaction,a solution of 1.8 parts of 1-methylethane-1,2-diamine and 1.8 parts of 1,3-propanediamine in 30 parts of water are added dropwise such that the pH does not exceed 9.5 and is kept at this value by addition of aqueous sodium hydroxide. The solution is allowed to warm to room temperature and freed from salt by dialysis, and the resultant product is obtained by evaporative concentration.

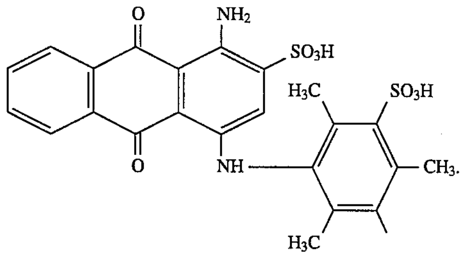

The compound can be prepared as follows: 14 parts of cyanuric fluoride are added dropwise to a neutral solution of 53 parts of 1-amino-4-(3-amino-2,4,6-trimethyl-5 -sulfophenyl)anthraquinone-2-sulfonic acid and 5 parts of disodium hydrogenphosphate in 500 parts of water at a temperature below 2° C., while keeping the pH constant by the addition of sodium hydroxide solution. Upon completion of the reaction,a solution of 6 parts of ethylenediamine in 54 parts of water are added dropwise such that the temperature does not exceed 5 and the pH remains at 6. The pH is then kept at 6. A solution of 1-amino-4-{3-[4-(2-amino-ethylamino)-6-fluoro-[1,3,5]-triazin-2 -ylamino]- 2,4,6-trim-

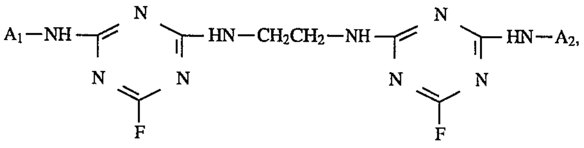

wherein $A_1$ is a radical of formula

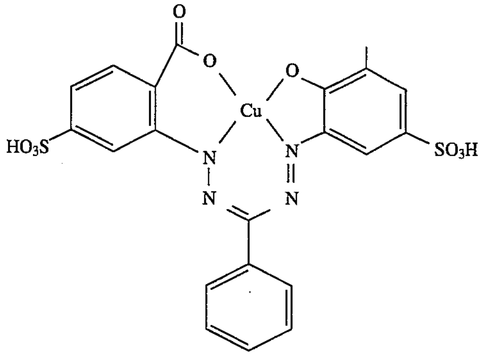

and $A_2$ is a radical of formula ethyl-5-sulfophenyl)}-anthraquinone-2-sulfonic acid (solution 1) is obtained.

14 parts of cyanuric fluoride are added dropwise to a neutral solution of 60 parts of the copper complex of 5-amino-3-[3-phenyl-5-(2-carboxy-5-sulfophenyl)-1-formazano]-4 -hydroxybenzenesulfonic acid and 5 parts of disodium hydrogenphosphate in 500 parts of water at a temperature below 2° C., while keeping the pH constant by the addition of sodium hydroxide solution.

A solution of 5-[4,6-difluoro-[1,3,5]-triazin-2-ylamino]-3-[3-phenyl-5-(2 -carboxy-5-sulfophenyl)- 1-formazano]-4-hydroxybenzenesulfonic acid is obtained (solution 2).

Solution 2 is added to solution 1 and the pH is raised to 8.5 and kept thereat. The solution is allowed to warm to room temperature, freed by dialysis from salt and the dye is obtained by evaporative concentration.

What is claimed is:

1. A process for washing a print or dyeing produced with a dye on a cellulosic textile material, which comprises treating the printed or dyed material in an aqueous wash liquor with 0.25 to 5 grams per liter of a washing-off formulation consisting essentially of (a) 50–50% polyvinyl pyrrolidone homopolymer or copolymer, and (b) 95–50% of an alkali silicate.

2. A process according to claim 1, wherein the polyvinyl pyrrolidone homopolymer or copolymer (a) is a polyvinyl pyrrolidone homopolymer or copolymer containing ≧50% molar of vinyl pyrrolidone units.

3. A process according to claim 1, wherein the polyvinyl pyrrolidone homopolymer or copolymer (a) is a polyvinyl pyrrolidone homopolymer having an average molecular weight of 1,000 to 1,000,000.

4. A process according to claim 1, wherein the alkali silicate has a $Me_2O:SiO_2$ ratio of 0.5 to 3.5.

5. A process according to claim 1, wherein the alkali silicate is anhydrous sodium metasilicate or sodium metasilicate-5- or -9-hydrate.

6. A process according to a claim 1 for washing prints or dyeings produced with reactive dyes.

7. A process according to claim 1, which comprises first dyeing the fibre materials in the presence of an amount of 0 to 20 g per liter of a salt of a mineral acid and using at least one reactive dye of formula

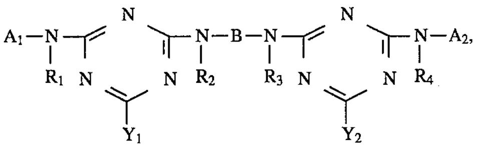

(1)

wherein $A_1$ is the radical of a a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $A_2$ independently of $A_1$ has the meaning of $A_1$ or is hydrogen or is a colourless organic radical, $R_1$, $R_2$, $R_3$ and $R_4$ are each independently of one another hydrogen or unsubstituted or substituted $C_1$–$C_4$alkyl, B is an aliphatic or aromatic linking group, and $Y_1$ and $Y_2$ are each independently of the other fluoro or carboxypyridinium; or

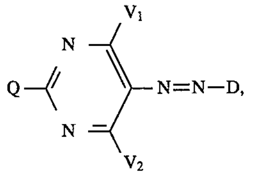

(2)

wherein D is the radical of a diazo component, Q is an unsubstituted or substituted phenyl or naphthyl radical, or an unsubstituted or substituted aromatic-heterocyclic radical, and $V_1$ and $V_2$ are each independently of the other a radical of formula

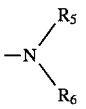

(3)

wherein $R_5$ and $R_6$ are each independently of the other hydrogen, unsubstituted or substituted aryl or unsubstituted or substituted $C_1$–$C_6$alkyl, and alkyl, with the exception of methyl, may be interrupted by —O— or —NR'—, and R' is hydrogen or $C_1$–$C_4$alkyl, or $NR_5R_6$ form a heterocyclic 5- or 6-membered ring which is unsubstituted or further substituted, with the proviso that at least one of $V_1$, $V_2$ and D carries a fibre-reactive group.

8. A process according to claim 1, which comprises treating the cellulosic fibre materials in the temperature range from 60° to 100° C. with the washing-off formulation.

9. A process according to claim 1 for washing prints or dyeings wherein said cellulose material is cotton or cotton polyester blends.

10. A process for washing prints or dyeings produced with reactive dyes on cellulosic fibre materials according to claim 1, which comprises treating said dyed or printed fibre materials in an aqueous wash liquor with 0.25 to 5 g/l of a washing-off formulation consisting essentially of (a) 5 to 50% by weight of a polyvinyl pyrrolidone homopolymer, and (b) 95 to 50% by weight of an alkali silicate, in the temperature range from 60° to 100° C.

11. A process for washing prints or dyeings produced with reactive dyes on cellulosic fibre materials, which comprises dyeing said fibre materials in the presence of 0 to 20 g per liter of a salt of a mineral acid and at least one reactive dye of formula

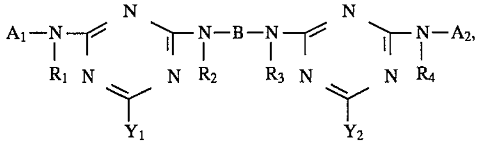

(1)

wherein $A_1$ is the radical of a a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $A_2$ independently of $A_1$ has the meaning of $A_1$ or is hydrogen or is a colourless organic radical, $R_1$, $R_2$, $R_3$ and $R_4$ are each independently of one another hydrogen or unsubstituted or substituted $C_1$–$C_4$alkyl, B is an aliphatic or aromatic linking group, and $Y_1$ and $Y_2$ are each independently of the other fluoro or carboxypyridinium; or

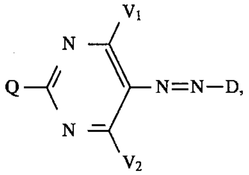

(2)

wherein D is the radical of a diazo component, Q is an unsubstituted or substituted phenyl or naphthyl radical, or an unsubstituted or substituted aromatic-heterocyclic radical, and $V_1$ and $V_2$ are each independently of the other a radical of formula

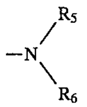

(3)

wherein $R_5$ and $R_6$ are each independently of the other hydrogen, unsubstituted or substituted aryl or unsubstituted or substituted $C_1$–$C_6$alkyl, and alkyl, with the exception of methyl, may be interrupted by —O— or —NR'—, and R' is hydrogen or $C_1$–$C_4$alkyl, or $NR_5R_6$ form a heterocyclic 5- or 6-membered ring which is unsubstituted or further substituted, with the proviso that at least one of $V_1$, $V_2$ and D carries a fibre-reactive group, and subsequently treating the dyed fibre materials in an aqueous wash liquor with 0.5 to 2 g/l of a washing-off formulation consisting essentially of (a) 10 to 25% by weight of a polyvinyl pyrrolidone homopolymer having an average molecular weight of 2,500 to 750,000, (b) 90 to 75% by weight of anhydrous sodium metasilicate or sodium metasilicate-5- or -9-hydrate, and (c) 0 to 1% by weight of a dust inhibitor, in the temperature range from 60° to 100° C.

12. A process according to claim 1, wherein the aqueous wash liquor contains from 0.25 to 5 grams per liter of a washing-off formulation, wherein the washing-off formulation contains (a) 10 to 25% by weight, of a polyvinyl pyrrolidone homopolymer having an average molecular weight of 2,500 to 750,000, (b) 90 to 75% by weight, of a potassium or sodium metasilicate, and (c) 0 to 5% by weight of a dust inhibitor.

* * * * *